(12) United States Patent
Ramasubramanian et al.

(10) Patent No.: US 7,685,185 B2
(45) Date of Patent: *Mar. 23, 2010

(54) MOVE-IN/MOVE-OUT NOTIFICATION FOR PARTIAL REPLICA SYNCHRONIZATION

(75) Inventors: Venugopalan Saraswati Ramasubramanian, Mountain View, CA (US); Thomas L. Rodeheffer, Mountain View, CA (US); Douglas B. Terry, San Carlos, CA (US); Edward P. Wobber, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/771,153

(22) Filed: Jun. 29, 2007

(65) Prior Publication Data

US 2009/0006495 A1  Jan. 1, 2009

(51) Int. Cl.
*G06F 17/00* (2006.01)
(52) U.S. Cl. .................. 707/638; 707/635; 707/655
(58) Field of Classification Search ............... 707/610, 707/635, 638, 655
See application file for complete search history.

(56) References Cited

U.S. PATENT DOCUMENTS

| | | | | | |
|---|---|---|---|---|---|
| 4,432,057 | A | * | 2/1984 | Daniell et al. | 707/8 |
| 5,675,802 | A | * | 10/1997 | Allen et al. | 717/103 |
| 5,758,337 | A | * | 5/1998 | Hammond | 707/6 |
| 5,864,867 | A | | 1/1999 | Krusche et al. | |
| 5,870,759 | A | * | 2/1999 | Bauer et al. | 707/201 |
| 5,870,765 | A | * | 2/1999 | Bauer et al. | 707/203 |
| 5,873,096 | A | * | 2/1999 | Lim et al. | 707/201 |
| 5,926,816 | A | * | 7/1999 | Bauer et al. | 707/8 |
| 6,125,371 | A | | 9/2000 | Bohannon et al. | |
| 6,393,434 | B1 | * | 5/2002 | Huang et al. | 707/200 |
| 6,460,055 | B1 | * | 10/2002 | Midgley et al. | 707/204 |
| 6,539,381 | B1 | | 3/2003 | Prasad et al. | |
| 6,560,604 | B1 | | 5/2003 | Fascenda | |
| 6,643,671 | B2 | * | 11/2003 | Milillo et al. | 707/204 |
| 6,757,896 | B1 | * | 6/2004 | Cohen et al. | 718/100 |

(Continued)

FOREIGN PATENT DOCUMENTS

EP       949821 A2  *  10/1999

(Continued)

OTHER PUBLICATIONS

Fay Chang, Jeffrey Dean, Sanjay Ghemawat, Wilson Hsieh, Deborah Wallach, Mike Burrows, Tushar Chandra, Andrew Fikes, Robert Gruber; Bigtable: a distributed storage system for structured data, 2006; Operating Systems Design and Implementation, Proceedings of the 7th symposium on Operating systems design & implementation; p. 205-218; ACM library.*

(Continued)

*Primary Examiner*—Shahid A Alam
(74) *Attorney, Agent, or Firm*—Vierra Magen Marcus & DeNiro LLP

(57) ABSTRACT

A system is disclosed for synchronizing partially-replicated collections using the concept of item-set knowledge and move-out notifications. Move-out notifications are provided to allow removal of changed items from replicas when the change in the item takes that item outside of the interest set of the replicas.

18 Claims, 17 Drawing Sheets

U.S. PATENT DOCUMENTS

| | | | |
|---|---|---|---|
| 6,779,019 | B1 | 8/2004 | Mousseau et al. |
| 6,865,715 | B2 | 3/2005 | Uchino et al. |
| 6,910,052 | B2 * | 6/2005 | Gates et al. ................. 707/201 |
| 6,970,876 | B2 | 11/2005 | Hotti et al. |
| 6,993,539 | B2 | 1/2006 | Federwisch et al. |
| 7,149,761 | B2 | 12/2006 | Cooke et al. |
| 7,321,904 | B2 * | 1/2008 | Holenstein et al. .......... 707/201 |
| 7,421,457 | B2 * | 9/2008 | Brodersen et al. ........... 707/201 |
| 7,440,985 | B2 * | 10/2008 | Novik et al. ................ 707/204 |
| 7,483,923 | B2 * | 1/2009 | Novik ......................... 707/201 |
| 7,500,020 | B1 * | 3/2009 | Kabra et al. ................ 709/248 |
| 7,506,007 | B2 * | 3/2009 | Bjorner ....................... 707/204 |
| 7,555,493 | B2 | 6/2009 | Khayter et al. |
| 2002/0147711 | A1 | 10/2002 | Hattori et al. |
| 2004/0117667 | A1 | 6/2004 | Lavender et al. |
| 2004/0153473 | A1 | 8/2004 | Hutchinson et al. |
| 2004/0193952 | A1 | 9/2004 | Narayanan et al. |
| 2005/0015436 | A1 | 1/2005 | Singh et al. |
| 2005/0027755 | A1 * | 2/2005 | Shah et al. .................. 707/201 |
| 2005/0027817 | A1 | 2/2005 | Novik et al. |
| 2005/0055698 | A1 | 3/2005 | Sasaki et al. |
| 2005/0102392 | A1 | 5/2005 | Bou-Ghannam et al. |
| 2005/0108200 | A1 | 5/2005 | Meik et al. |
| 2005/0125621 | A1 | 6/2005 | Shah |
| 2005/0240640 | A1 | 10/2005 | Kaler et al. |
| 2005/0246389 | A1 | 11/2005 | Shah et al. |
| 2005/0273730 | A1 | 12/2005 | Card et al. |
| 2006/0020570 | A1 | 1/2006 | Wu |
| 2006/0089925 | A1 | 4/2006 | Kumar |
| 2006/0136570 | A1 | 6/2006 | Pandya |
| 2006/0190572 | A1 | 8/2006 | Novik et al. |
| 2006/0206768 | A1 | 9/2006 | Varghese |
| 2006/0215569 | A1 | 9/2006 | Khosravy et al. |
| 2006/0242443 | A1 | 10/2006 | Talius et al. |
| 2007/0266031 | A1 | 11/2007 | Adams et al. |
| 2009/0019054 | A1 | 1/2009 | Mace et al. |

FOREIGN PATENT DOCUMENTS

| | | | |
|---|---|---|---|
| EP | 974895 | A2 * | 1/2000 |
| EP | 1288796 | A2 * | 3/2003 |
| JP | 2004318849 | A * | 11/2004 |
| WO | WO 9724669 | A1 * | 7/1997 |

OTHER PUBLICATIONS

Haraldur D. Thorvaldsson, "Dynamic Evolution In a Survivable Application Infrastructure", 1982, pp. 1-7.

Karin Petersen, "Flexible Update Propagation for Ewakly Consistent Replication", 1997, pp. 288-301, ACM, New York, NY, USA.

Office Action dated Apr. 29, 2009 in U.S. Appl. No. 11/618,090.

Office Action dated Apr. 29, 2009 in U.S. Appl. No. 11/751,478.

Mike Dahlin, Data Synchronization for Distributed Simulations, European Simulation Interoperability Wrokshop, 2000, Austin, TX.

Thorsten Schutt, Efficient Synchronization of Replicated Data in Distributed Systems, Computational Science-ICCS 2003, 2003, pp. 662, vol. 2657/2003, Springer Berlin/Heidelberg.

Navendu Jain, Taper: Tiered Approach for Eliminating Redundancy in Replica Synchronization, Proceedings of the 4th Conference on USENIX Conference on File and Storage Technologies San Francisco, CA, 2005, pp. 21, vol. 4, USENIX Association, Berkley, CA.

Sivaramakrishnan Narayanan, A Runtime Framework for Partial Replication and Its Application for On-Demand Data Exploration, Department of Biomedical Informatics, The Ohio State University, Columbus, OH.

Changqin Huang, Massive Data Oriented Replication Algorithms for Consistency Maintenance in Data Grids, ICCS 2006 Part 1, 2006, pp. 838-841, Springer-Verlag Berlin Heidelberg.

Nalini Belaramani, PRACTI Replication, Third Symposium on Networked Systems Design and Implementation, USINEX NSDI Proceedings, May 2006, pp. 59-72, San Jose, CA, USA.

Response to Office Action filed Nov. 5, 2009 in U.S. Appl. No. 11/771,273.

Response to Office Action filed Jul. 29, 2009 in U.S. Appl. No. 11/751,478.

Office Action dated Aug. 5, 2009 in U.S. Appl. No. 11/771,273.

Final Office Action dated Dec. 1, 2009 in U.S. Appl. No. 11/751,478.

* cited by examiner

MOVE-IN/MOVE-OUT NOTIFICATION FOR PARTIAL REPLICA SYNCHRONIZATION

CROSS-REFERENCE TO RELATED APPLICATION

The following application is cross-referenced and incorporated by reference herein in its entirety:

U.S. patent application Ser. No. 11/751,478 [MS# 318994.01], entitled "Item-Set Knowledge for Partial Replica Synchronization," by Ramasubramanian et al., filed on May 21, 2007.

BACKGROUND

In a collection of computing devices, a data item may be multiply replicated to create a number of copies of the item on the different computing devices and/or possibly within a single device. An item may be any stored data object, such as for example contact or calendar information, stored pictures or music files, software application programs, files or routines, etc. The collection of computing devices may for example be a desktop computer, a remote central server, a personal digital assistant (PDA), a cellular telephone, etc. The group of all such items and replicas where the items are stored may be referred to as a distributed collection.

In many cases, a user would like all of their various data storing devices to have the latest updated information without having to manually input the same changes into each device data store. Replication, or synchronization, of data is one process used to ensure that each data store has the same information. Synchronization protocols are the means by which devices exchange created and updated versions of items in order to bring themselves into a mutually consistent state. The periodicity of the sync may vary greatly. Networked devices may sync with each other frequently, such as once every minute, hour, day, etc. Alternatively, devices may sync infrequently, such as for example where a portable computing device is remote and disconnected from a network for a longer period of time. Whether the synchronization is frequent or infrequent, the distributed collection is said to be weakly-consistent in that, in any given instant, devices may have differing views of the collection of items because items updated at one device may not yet be known to other devices.

As an example, a user may maintain an electronic address book or a set of email messages in a variety of different devices or locations. The user may maintain the address book or email addresses, for example, on a desktop computer, on their laptop computer, on a personal digital assistant (PDA) and/or mobile phone. The user may modify the contact information or send/receive email addresses using applications associated with each location. Regardless of where or how a change is made, one goal of replication is to ensure that a change made on a particular device or in a particular location is ultimately reflected in the data stores of the other devices and in the other locations.

FIG. 1 illustrates a weakly-consistent distributed collection, including multiple replicas A-F. Each replica A-F may be a computing device including a data store and associated processor. However, as is known, a single computing device may include several replicas, and a single replica may be implemented using more than one computing device. In the example of FIG. 1, the replicas may include a desktop computer A, a pair of laptop computers B and C, a cellular telephone D, a personal digital assistant (PDA) E and a digital camera F. The number and type of replicas is by way of example and may be more, less and/or different than shown.

FIG. 1 further shows communication links 22 (represented by dashed lines) between the various replicas to establish a peer-to-peer network. It may often be the case that not all replicas are linked to all other replicas. For example, laptop B is linked to desktop A, laptop C, cellular phone D and PDA E, but not digital camera F. Consequently, laptop B can sync with digital camera F only through one or more intermediate sync steps involving replicas C or E. The illustrated communication links can be wired and/or wireless links. The configuration of communication links between replicas is called the "synchronization topology". Two replicas that communicate periodically to synchronize their shared data are called sync "partners".

Synchronization between replicas may be described as a sharing of knowledge between replicas. A common knowledge sharing scheme involves tracking, within each replica, changes that have occurred to one or more items subsequent to a previous replication. One such tracking scheme makes use of version vectors, which consist of list of version numbers, one per replica, where each version number is an increasing count of updates made to an item by a replica. During synchronization, one replica sends version vectors for all of its stored items to another replica, which uses these received version vectors to determine which updated items it is missing. Comparing the version vectors of two copies of an item tells whether one copy is more up-to-date (every version number in the up-to-date copy is greater than or equal to the corresponding version number in the other copy) or whether the two copies conflict (the version vectors are incomparable). The replica may then update its copy of the item if required or make efforts to resolve the detected conflict.

Although version vectors enable replicas to synchronize correctly, they introduce overhead. The version vector of each item may take $O(N)$ space in an N replica replication system, thus requiring $O(M*N)$ space across an M item collection. This space requirement could be substantial if the number of items is large and could approach the size of the items themselves if items are small. Similarly, exchanging version vectors during synchronization consumes bandwidth. Even if two replicas have fully consistent data stores, they still need to send a complete list of version vectors whenever they periodically perform synchronization.

Another knowledge sharing scheme, implemented for example in the WINFS data storage and management system from Microsoft Corp., makes use of knowledge vectors. Unlike version vectors, knowledge vectors are associated with the replicas rather than the items. Each replica keeps a count of the updates it generates, and the knowledge vector of a replica consists of the version number of the latest update it learned from every other replica. In addition, items at a replica have a single version number indicating the latest update applied to it. Replicas exchange knowledge vectors during synchronization, determine and exchange the missing updates, and change their knowledge vector to reflect the newly-learned knowledge (each number is set to the maximum of the corresponding numbers in the two knowledge vectors of the synchronizing replicas).

An example of knowledge sharing between a pair of replicas using knowledge vectors is illustrated with respect to prior art FIGS. 2 and 3. In the example of FIGS. 2 and 3, replica A is synching with replica B. Replica A has a data store 24 including a knowledge vector, $K_A$, and a set of replicated items. The knowledge vector in replica A includes one or more pairs of replica IDs together with update counters, which together represent what knowledge replica A has about changes that have occurred to items in the collection. For example, knowledge vector $K_A$ may have the components:

$K_A = A5B3C7.$

This means that replica A has knowledge including changes up to the $5^{th}$ change in replica A, the $3^{rd}$ change in replica B, and the $7^{th}$ change in replica C.

Each of the changes indicated in the knowledge vector may be represented in the set of replicated items. For example, assume four items in the collection, identified by unique identifiers i, j, l and m. The set of items stored in data store 24 at Replica A may look as follows:

TABLE 1

| Item Unique ID | Version | Data |
|---|---|---|
| i | A2 | ... |
| j | C7 | ... |
| l | A5 | ... |
| m | B3 | ... |

The data store thus indicates, for a given item, which version was produced when that item was last changed (i.e. the item was created, modified or deleted) as far as this replica is aware, and the data showing the actual updated contents (not shown in Table 1). Thus, for example, replica A knows that the $7^{th}$ change in replica C was to item j, and it includes the data associated with the change to item j.

Similarly, replica B has a data store 24 including a knowledge vector, $K_B$, and a set of replicated items. The knowledge vector in replica B represents what knowledge replica B has about changes that have occurred to items in the collection. For example, knowledge vector $K_B$ may have the components:

$K_B = A2B5C8.$

This means that replica B has knowledge including changes up to the $2^{nd}$ change in replica A, the $5^{th}$ change in replica B and the $8^{th}$ change in replica C. Each of these changes is represented in the set of items stored by replica B.

Referring now to prior art FIG. 3, at time 1, replica A sends a sync request along with replica A's knowledge, which may be represented by replica A's knowledge vector, to replica B. At time 2, replica B examines replica A's knowledge by comparing the respective knowledge vectors. Replica B discovers that replica A is not aware of changes made by replica B that are labeled with the version B5, or changes made by replica C (which are known to replica B) that are labeled with the version C8. Thus, replica B sends the items with these versions. Subsequently or simultaneously as illustrated in time 3, replica B sends to replica A replica B's learned knowledge.

As this is a one-way synchronization, this ends the sync process resulting from replica A's sync request (in a two way sync, the process would be repeated with replica B receiving changes from replica A and learning what knowledge replica A has). Replica A can update its knowledge vector based on the learned knowledge and received changes to include the recently replicated changes as shown in Replica A in FIG. 3.

Knowledge vectors impose substantially lower overhead compared to version vectors. The space required per replica to store knowledge vectors is just $O(N+M)$, including the space required for per item version numbers, compared to $O(N*M)$ for version vectors, where the system has N replicas and the replica has M items. Further more, exchanging knowledge vectors only requires $O(N)$ bandwidth compared to $O(N*M)$ for exchanging version vectors.

While knowledge vectors work well for total replication between replicas, it may happen that one or more replicas are only interested in receiving a certain subset of information. This situation is referred to as partial replication. For example, suppose the data store includes email messages in various folders, including an inbox folder and some number of other folders including, perhaps, folders that contain saved email messages. In some cases a user might want to replicate changes to all of the email folders. For example, this might be desirable when the communications bandwidth between replicating devices is large. In other cases—perhaps when the bandwidth is limited, as it might be at some times with a mobile phone or PDA—the user might only want to replicate changes to a particular folder, like their inbox.

It is also conceivable that a user might want to synchronize only part of their entire set of data in all cases. For example, a user might want to maintain all email on a desktop computer or server, but only synchronize their inbox and a selected set of folders to a small device that has limited storage. In this case, some information may never be synchronized with a particular device.

As another example, for a data store that includes digital music files, a user might want to synchronize their entire digital music library—perhaps they have a portable music player or computer with a large hard drive. They may also have a small portable music player with a limited amount of flash memory, on which they only want to store a selected set of music. In one example, this music to be synchronized might include, for example, digital music files the user has rated with "four stars" or "five stars," as well as music downloaded in the last week.

In order to allow for partial replication in the above situations, as well as a wide variety of others, a replica may contain a filter. A "filter" may be broadly defined as any construct that serves to identify a particular set of items in a data collection. These items are said to fall within the partial replica's "interest set". When synchronizing in a partial replication scenario, like in the situations introduced above, various additional problems may occur. These problems include the following:

Efficient knowledge sharing: A partial replica is interested in only a certain subset of items and consequently has knowledge that is limited by its interest set. When a partial replica shares its knowledge with a second replica, the second replica must somehow account for this limitation. This is not a problem for a version vector knowledge sharing scheme, which maintains knowledge about each item separately. However, a knowledge vector knowledge sharing scheme maintains its knowledge vector about the replica as a whole rather than about each item separately. This results in a substantial savings in storage and bandwidth as compared with version vectors, but it also makes it a problem to account for a limited interest set.

Partial information: In order for a replica to eventually learn about an item within its interest set, it requires a synchronization path to all other replicas that are interested in the same item. Moreover, each intermediate replica in the synchronization path must also be interested in the item. Otherwise, a replica may not receive complete information about all the items it is interested in. For example, in FIG. 1, if the camera F takes a picture that the cell phone D wants to use as a background but the laptop C and the PDA E are not interested in the picture then the cell phone D has no way of obtaining it with its existing synchronization topology and methods.

Push outs: When a partial replica updates an item, the updated item may no longer fall within the replica's interest set. Although the partial replica would like to discard such an item, it may find itself in the situation of holding the only copy, in which case discarding the updated item would cause the update to evaporate from the collection. In this situation, the partial replica must "push out" the item to another replica before discarding it. A similar situation can arise when a partial replica alters its filter. For example, in FIG. 1, while a user might take a large number of pictures with digital camera F, perhaps the user desires a policy of storing only the most recent 100 pictures on the camera because of its limited storage. Such a policy could be effected by altering the camera's filter each time a new picture is taken so as to exclude an old picture. However, camera F can safely discard the old picture only if there is a guarantee that the picture is stored elsewhere. This could be done by transferring the picture to another replica during synchronization. However, ensuring such transfers eventually result in durable storage for the pictures is difficult with arbitrary synchronization topologies.

Move outs: When a partial replica is the target of a synchronization, the source replica may be aware of an update to an item for which an old version is stored by the partial replica, but the new version does not fall within the partial replica's interest set. The partial replica needs to be made aware that the item it stores has been updated so as to "move out" of its interest set. For example, in FIG. 1, suppose that Laptop B stores a full calendar of all baseball games and cell phone D is interested in storing only weekend games. A weekend game moves to a week day and the user at Laptop B updates the item accordingly. When cell phone D next synchronizes from Laptop B, it must receive a "move-out" notification.

Reincarnation: When a replica deletes an item, the system needs to ensure that all copies of that item are permanently deleted from the system. If not, the deleted copy might get resurrected at a later point of time based on an old version. Resurrection of deleted items is a concern even without considering partial replicas. Partial replicas add the related problem that an item discarded due to a move-out might be "reincarnated" from an old version synced from an out-of-date replica.

Filter Changes: Finally, replicas may change filters at any time causing some items to move out of the interest set as well as disrupt the path of information flow the replica relies on to learn new items. For example, in FIG. 1, if the laptop C changes its filter to exclude all pictures then replicas A, B, and D may have no way of receiving the pictures taken by the camera F (assuming PDA E was not interested in pictures in the first place). It is desirable to ensure that filter changes do not disrupt information flow and items discarded during filter changes are completely expunged without the risk of resurrections.

Except for the problem of efficient knowledge sharing, a reason for the above problems is that arbitrary synchronization topologies do not provide a guaranteed path of information flow for replicas. A solution to provide guaranteed information paths is to have one or more replicas serve as reference replicas, which replicate all the items in the system, and have replicas synchronize with a reference replica periodically. However, it may not be always possible for all replicas to synchronize with reference replicas. Moreover, reference replicas may not be reachable at a dire time of need.

SUMMARY

The present technology, roughly described, relates to a system using item-set knowledge and move-out notifications to allow synchronization of partially-replicated collections while keeping synchronization overhead low. Item-set knowledge consists of one or more knowledge fragments, which associate knowledge vectors with sets of items, called item-sets, instead of with the whole replica. An item-set consists of an explicit list of unique item identifiers or the special symbol * ("star"), which refers to all possible item identifiers. A knowledge fragment with a star item-set is called "star knowledge".

Each replica may include a filter that defines an interest set of items that the replica wishes to store. A first replica may store an item that matches its filter. However, a second replica may make (or learn of) a change to the item that takes the item outside of the interest set of the first replica. According to embodiments of the present system, upon a sync request from the first replica to the second replica, the second replica sends a move-out notification to the first replica, informing the first replica of the change in the item's status and allowing the first replica to remove the item from its data store.

Where a first replica has learned of an update to an item and removes it from its data store and from its knowledge, there is a danger that a sync operation with a second replica that has not yet learned of the item update will cause the outdated item to be restored, or reincarnated, within the first replica. The problem is that the second replica observes that the outdated item is not in the first replica's knowledge, and hence the second replica sends the item to the first replica. In further embodiments, in order to prevent reincarnation of outdated items, the concept of class I and class II knowledge is employed. Class I knowledge represents the awareness a replica has of items within its interest set. Class II knowledge represents the awareness a replica has about items that are outside of the replica's interest set. The replica maintains class II knowledge about items that used to fall within the replica's interest set in order to prevent them from being reincarnated from outdated versions. Both class I and class II knowledge is represented as knowledge fragments.

While embodiments of the present system are described with respect to a system synchronizing using knowledge vectors, the use of class II knowledge to prevent reincarnation could be applicable to other replication systems that do not use item-set knowledge. Such systems include those that replicate using single knowledge vectors, knowledge vectors plus exceptions or those that use per-item version vectors.

A target replica initiating synchronization sends all of its knowledge (both class I and class II) to a source replica, which returns, in addition to updated items, move-out notifications and one or more class I and class II knowledge fragments as learned knowledge. By maintaining class II knowledge, the target replica remains aware of items outside of its interest set, even though it does not store these items, and thus can prevent outdated versions of items from reincarnating in its data store.

DETAILED DESCRIPTION

The present system will now be described with reference to FIGS. 4-19, which in general relate to synchronization in partial-replication systems. The system may be implemented on a distributed computing environment, including for example one or more desktop personal computers, laptops, handheld computers, personal digital assistants (PDAs), cellular telephones, multiprocessor systems, microprocessor-based systems, programmable consumer electronics, minicomputers, and/or other such computing system environments. Details relating to one such computing system environment are explained hereinafter with respect to FIG. 19. Two or more of the computing system environments may be continuously and/or intermittently connected to each other via a network such as peer-to-peer or other type of network as is known in the art.

Figure 1:
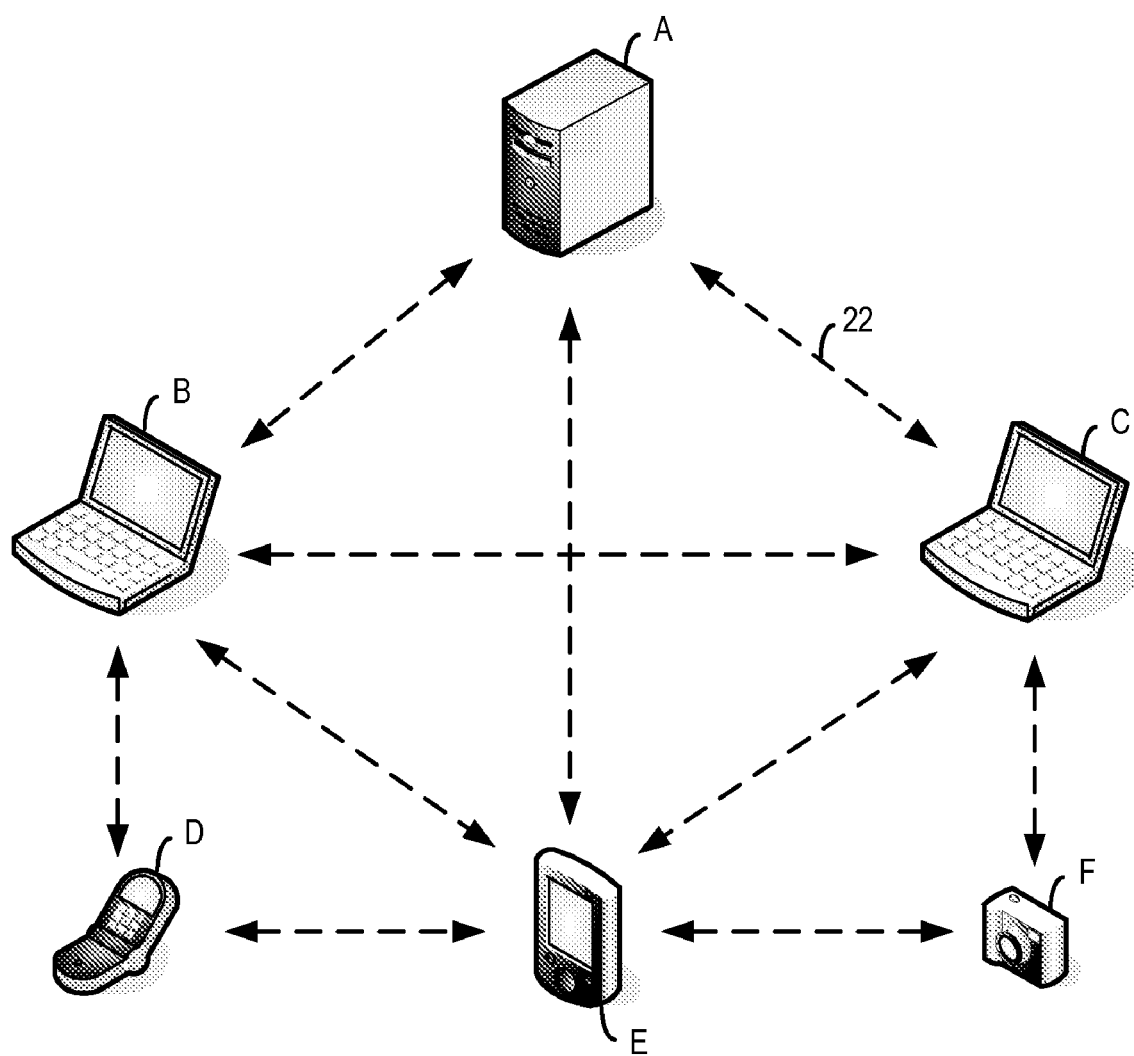
FIG. 1 is weakly-consistent distributed collection according to the prior art.
Figure 2:
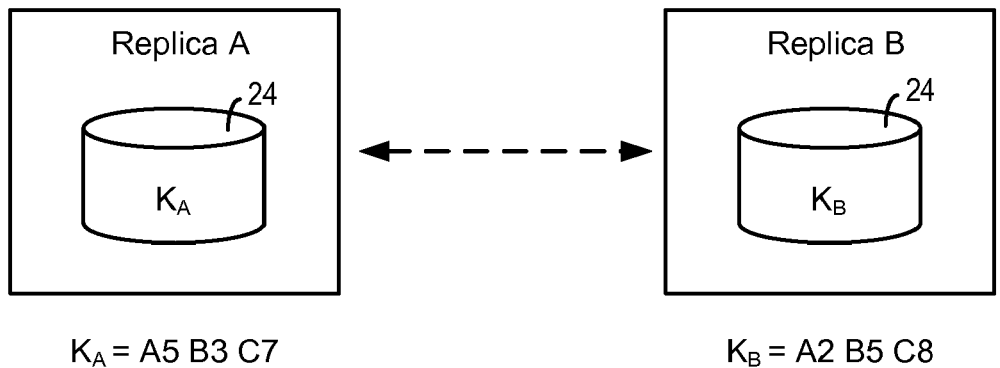
FIG. 2 shows a pair of replicas A and B and their respective knowledge according to the prior art.
Figure 3:
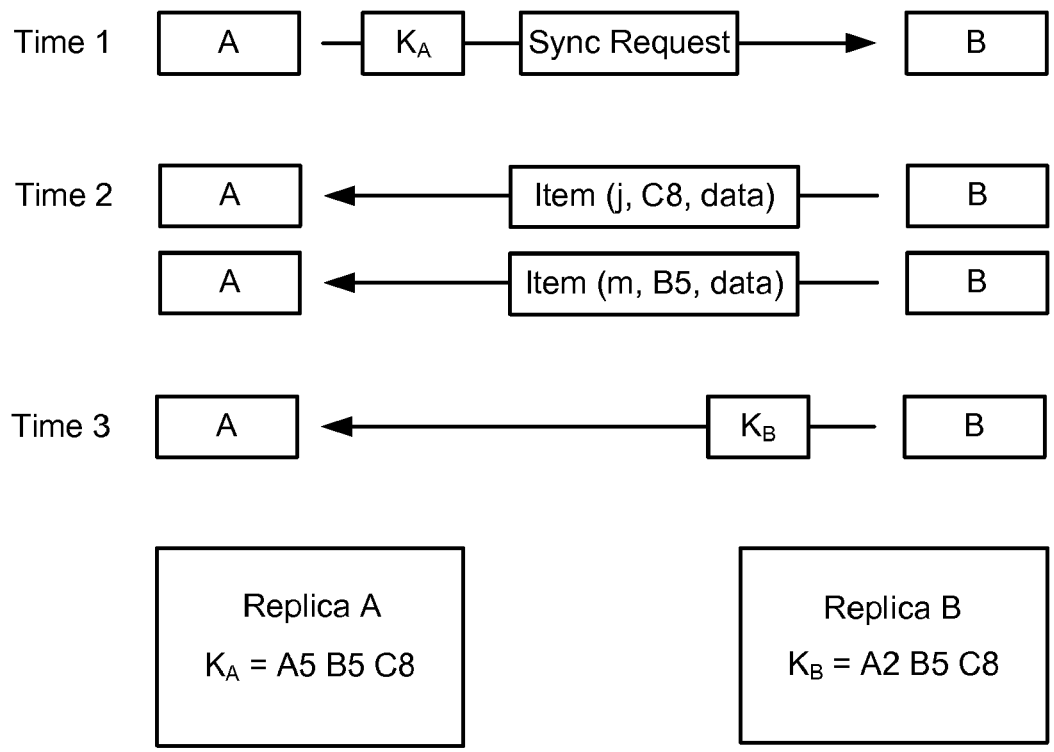
FIG. 3 show a synchronization operation between replicas A and B according to the prior art.
Figure 4:
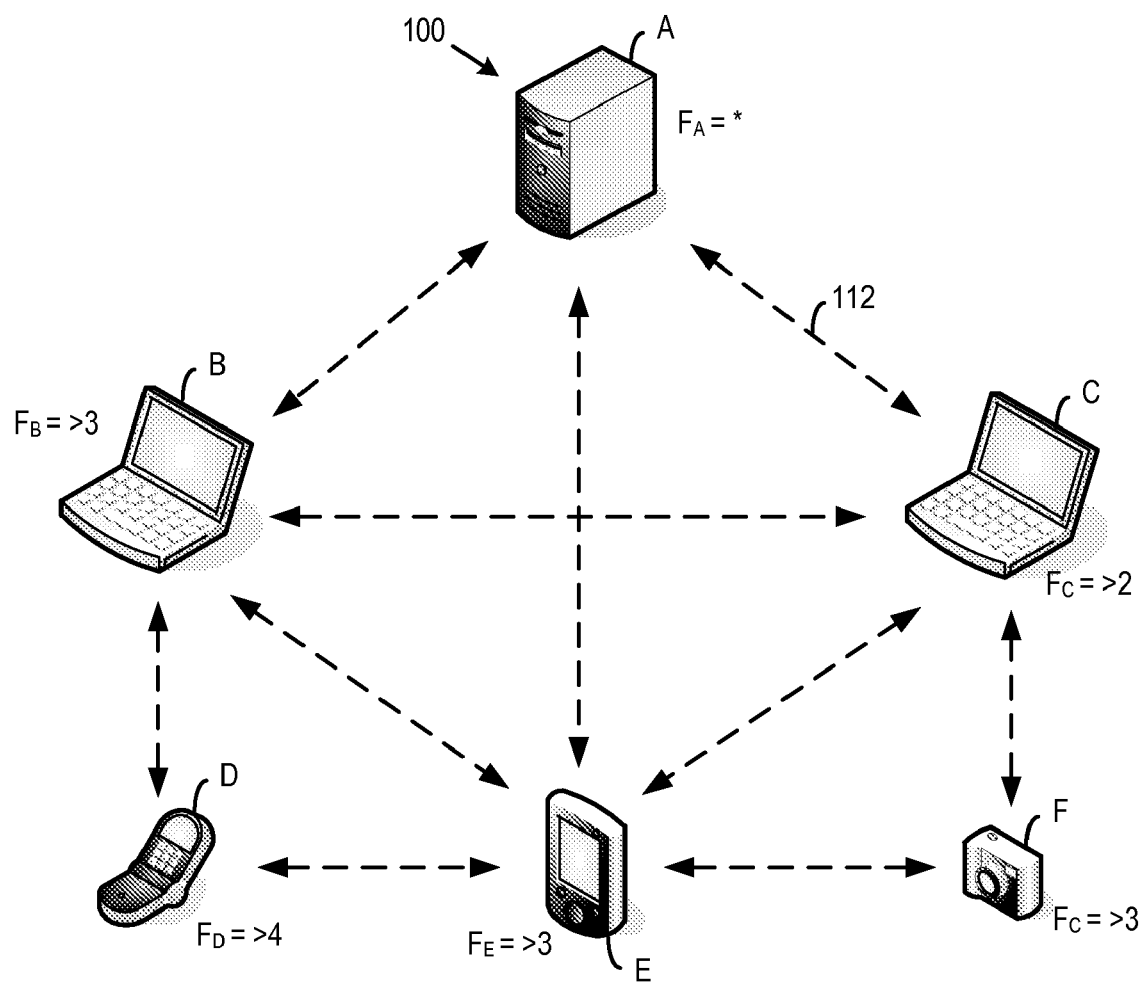
FIG. 4 is weakly-consistent distributed collection including one or more partial replicas according to embodiments of the present system.
Figure 5:
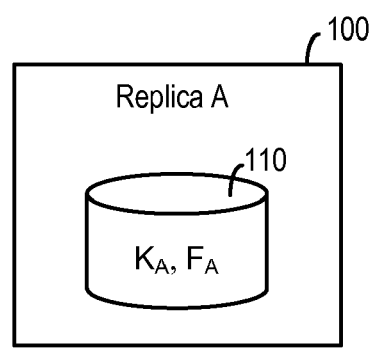
FIG. 5 shows a replica A including its knowledge and filter according to embodiments of the present system.

Referring initially to FIGS. 4 and 5, the system includes a plurality of replicas 100, arbitrarily referred to herein as replicas A through F. Each replica 100 may create and/or modify a version of an item in a collection. A replica may be a computing system environment. However, multiple replicas may exist on a single computing system environment, and a single replica may exist across multiple computing system environments. Each replica 100 may include a data store 110 associated with a processor on one or more computing system environments mentioned above or as known in the art. Each data store 110 may store data associated with items in the collection and a knowledge vector, K, indicating which versions of an item the replica is aware of. Each replica may also store more than a knowledge vector, such as for example the item-set fragments, version numbers, dirty bits, etc. Each replica 100 may additionally store a filter, F, to define a subset of items the replica is interested in storing. The processor can modify an item to produce a new version, place versions into the data store 110 and can discard versions from the data store 110.

In the example of FIG. 4, the replicas 100 may include a desktop computer A, a pair of laptop computers B and C, a cellular telephone D, a personal digital assistant (PDA) E and a digital camera F. The number and type of replicas comprising the collection shown in the figures is by way of example and there may be greater, fewer or different replicas in the collection than is shown. Moreover, the total membership of the collection does not necessarily need to be known to any given replica at any given time. Each replica in the sync community has a unique ID, which may be a global unique identifier (GUID) in one embodiment.

The replicas may communicate with each other in an ad hoc, peer-to-peer network via communication links 112 (represented by dashed lines) between the various replicas. It may be that not all replicas are linked to all other replicas. For example, laptop B is linked to desktop A, laptop C, cellular phone D, PDA E, but not digital camera F. Consequently, laptop B can sync with digital camera F only through one or more intermediate sync steps involving replicas C or E. The illustrated communication links can be wired and/or wireless links, and may or may not include the Internet, a LAN, a WLAN or any of a variety of other networks.

In accordance with the present system, the concept of item-set knowledge, as explained below, may be used to sync partial replicas with low synchronization overhead. Partial replicas are those for which a filter may be used to indicate a replica's interest set. A filter is any construct that serves to identify a particular set of items of local interest to a replica. These are the items that get stored in a replica's data store. A filter may select items from the data collection based on their contents or metadata. A filter may be a SQL query over tabular data or an XPath expression over XML representations of items or any other type of content-based predicate over item data or metadata. While any of a wide variety of criteria may be used to define a filter, in the example of FIG. 4, there is shown an example of a rating system, where different replicas have interest sets defined by items rated above a defined baseline. For example, replica F is interested in receiving items having a rating of "greater than 3," while replica C is interested in receiving items having a rating of "greater than 2." Replica A has no filter. Its interest set includes all items in the collection.

An item may fall within a filter at one time, but due to a subsequent change in the item, may fall outside the filter at another time. An example would be as follows. Suppose a partial replica has a filter that selects "all movies having a rating of three or more stars" (where the number of stars represents the subjective rating of the movie). In this example, when using a replica in the collection, a user may ascribe a movie a rating of three stars. Thus, upon synchronization, the partial replica having the "3 or more stars rating" filter would accept this movie. However, subsequently, the user or another authorized user may downgrade the rating of the movie to two stars. At that time, the partial replica having the "3 or more stars rating" filter would want to learn that the downgraded movie was no longer of interest and it would not be interested in further updates, unless the movie was again upgraded to three stars or more.

In some embodiments, the filter itself may be transmitted as part of the sync request. In other embodiments, the filter may be stored elsewhere and only some means of identifying the filter may be transmitted as part of the sync request. In yet other embodiments, certain types of sync requests may automatically result in the use of certain filters, in which case the filter itself may not be transmitted with the sync request. For example, a sync request transmitted over a low bandwidth connection might automatically result in the use of a filter that in some way reduces the number or nature of the items or changes returned.

Item-set knowledge associates knowledge vectors with item-sets, instead of with the whole replica. Each replica stores one or more knowledge fragments consisting of an explicitly represented list of items and an associated knowledge vector as well as version numbers for each item similar to the knowledge vector scheme. Item-set knowledge represents an intermediate position between the two extreme cases of per-item version vectors and knowledge vectors in terms of space and bandwidth consumption. In the best case, the item-set knowledge may just require one fragment to cover the knowledge of all the items in the replica, while in the worst case, it may require a separate fragment for each item in the replica.

Each replica's knowledge is a set of knowledge fragments. Each knowledge fragment consists of two parts: an explicit set of items (indicated by their GUIDs) and an associated set of versions represented by a knowledge vector. In addition, the latest version number for each item needs to be maintained separately by the replica. This is similar to the case of knowledge vectors. The semantics are that, for any item in the item-set, the replica is aware of any versions included in the associated knowledge vector. Knowledge fragments are additive, i.e. a replica knows about a specific version of a specific item if any of its knowledge fragments includes the item in the item-set and the version in the associated knowledge vector. A knowledge vector may include versions for items that are not in the associated item-set, in which case nothing can be concluded about these versions.

As a special case, a knowledge fragment may refer to the universal set of all items without needing to list all possible GUIDs. Such a knowledge fragment is called "star knowledge". Having star knowledge means that the replica is aware of all updates performed by each listed replica up to the corresponding version number in the knowledge vector.

A replica holds knowledge about items that it currently stores. This first type of knowledge is called "class I knowledge". In addition, a partial replica may be aware of items that it does not store because the current version of the item is outside its interest set. This second type of knowledge is called "class II knowledge". Further details relating to class I and class II knowledge are set forth hereinafter. As an alternative embodiment, a partial replica may store a "place holder" to represent an item that is outside its interest set. In this alternative embodiment, knowledge of place holders corresponds to class II knowledge.

A replica initiating synchronization sends all of its knowledge (both class I and class II) to the source replica, which returns, in addition to updated items, one or more knowledge fragments as learned knowledge.

When an item is created with a new version generated by the creating replica, this version is added to the replica's class I knowledge.

When an item is updated locally, preferably the new version number is simply added to the knowledge vector of the knowledge fragment that includes the item in its item-set. Alternatively, a new knowledge fragment could be created for the updated item. Optionally, the new version number could be added to all knowledge fragments.

A partial replica may choose to discard an item that it stores. For example, a partial replica will generally discard items that no longer match its filter. In such a case, the replica's awareness of the item changes from class I knowledge (about items the replica stores) to class II knowledge (about items the replica does not store and knows are outside its interest set).

Replicas may change their filters. If a partial replica modifies its filter, i.e. changes the predicate that selects items of local interest, then in the general case it must discard all of its class II knowledge, because it has no way of knowing whether those items match its new filter or not. However, if the new filter is more restrictive than the old filter, meaning that all items excluded by the old filter are also excluded by the new filter, then the class II knowledge is still valid and need not be discarded.

At the end of a synchronization session, the source replica transmits learned knowledge to the target replica. The learned knowledge, represented as a set of knowledge fragments, consists of all of the knowledge of the source replica subject to the restriction that items that may match the filter predicate of the target replica but are not stored by the source replica must be removed from the item-sets of the learned knowledge fragments. In practice, this means that class II knowledge will not be returned as learned knowledge unless the sending replica is a full replica or is a partial replica whose filter matches everything that would be selected by the receiving replica's filter. Learned knowledge fragments that are received at the completion of a synchronization session are simply added to the receiving replica's knowledge. Redundant fragments can be discarded as discussed below.

Figure 6:
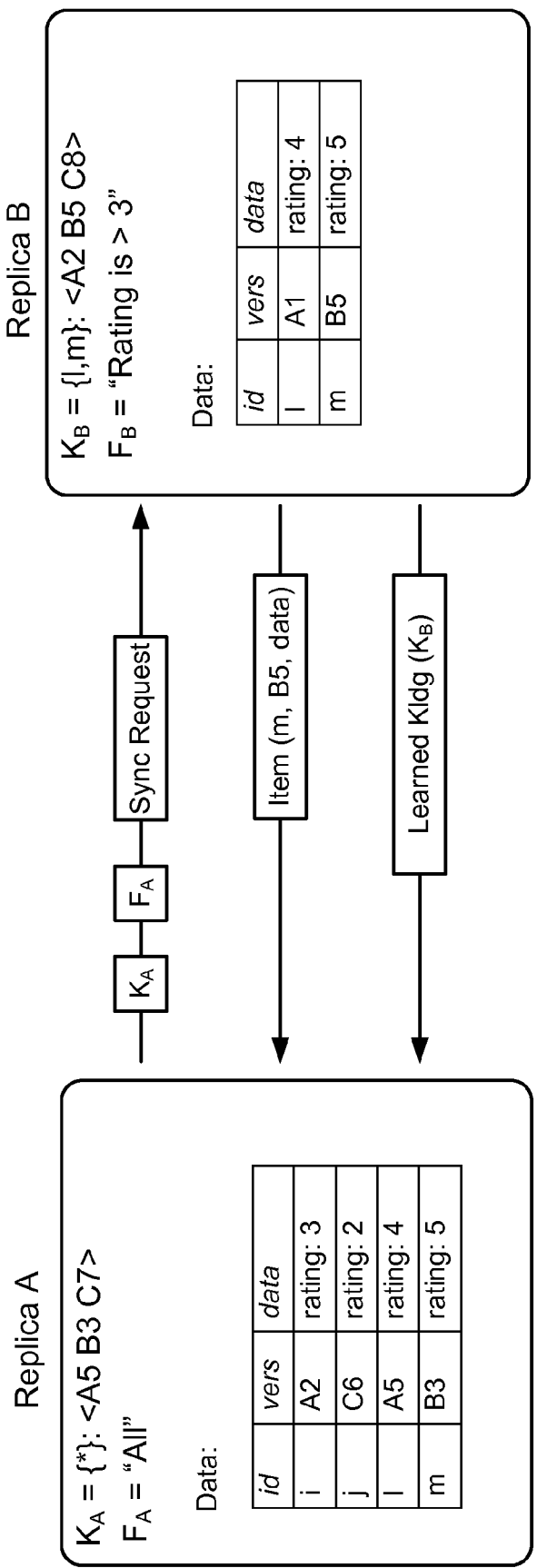
FIG. 6 shows a one-way synchronization operation between a pair of replicas A and B according to the present system.

Referring now to FIG. 6, there is shown an example of replication between two replicas using a filter. The example shown in FIG. 6 is a one-way synchronization. Namely, there is an initiating replica requesting the sync (in this example, replica A), and a source replica which is contacted to provide updated information (in this example, replica B). In this example, replica B determines updated items replica A is not aware of, and transmits those updated items to replica A. From the point of view of transmitting items, replica B is the sending replica and replica A is the receiving replica.

While the figures and following description indicate a particular order of execution, the operations and/or their order may vary in alternative embodiments. For example, a pair of replicas could sync one-way, exchange roles, and sync the other way, thus performing a two-way synchronization. Furthermore, in some implementations, some or all of the steps may be combined or executed contemporaneously. In the example of FIG. 6, replica A includes knowledge $K_A$ and a set of data items. Similarly, replica B includes knowledge $K_B$ and a set of items.

Each replica is said to have a knowledge fragment S:K, where S is an explicit set of items, or "*" for all items, indicating star knowledge. K is a knowledge vector. A knowledge fragment for a given replica, S:K, is interpreted as the given replica has knowledge about all versions in K for all items in S. Replica A is a full replica; that is, has no filter, with knowledge consisting of a single knowledge fragment:

$K_A = \{*\}:<A5B3C7>$ representing knowledge about items i, j, l and m having various associated ratings 2 through 5. Furthermore, since this is star knowledge, replica A knows that no other items were created or updated by any of the replicas A, B, and C up to the corresponding version numbers 5, 3, and 7.

In the example of FIG. 6, replica B has a filter relating to the rating of items. In particular, replica B accepts items having a rating of >3. The items may relate to anything capable of being rated, such as for example data relating to movies, books, videos, etc. Replica B has a knowledge fragment:

$K_B = \{l,m\}:<A2B5C8>$ representing knowledge about items l and m which have ratings>3.

Figure 7:
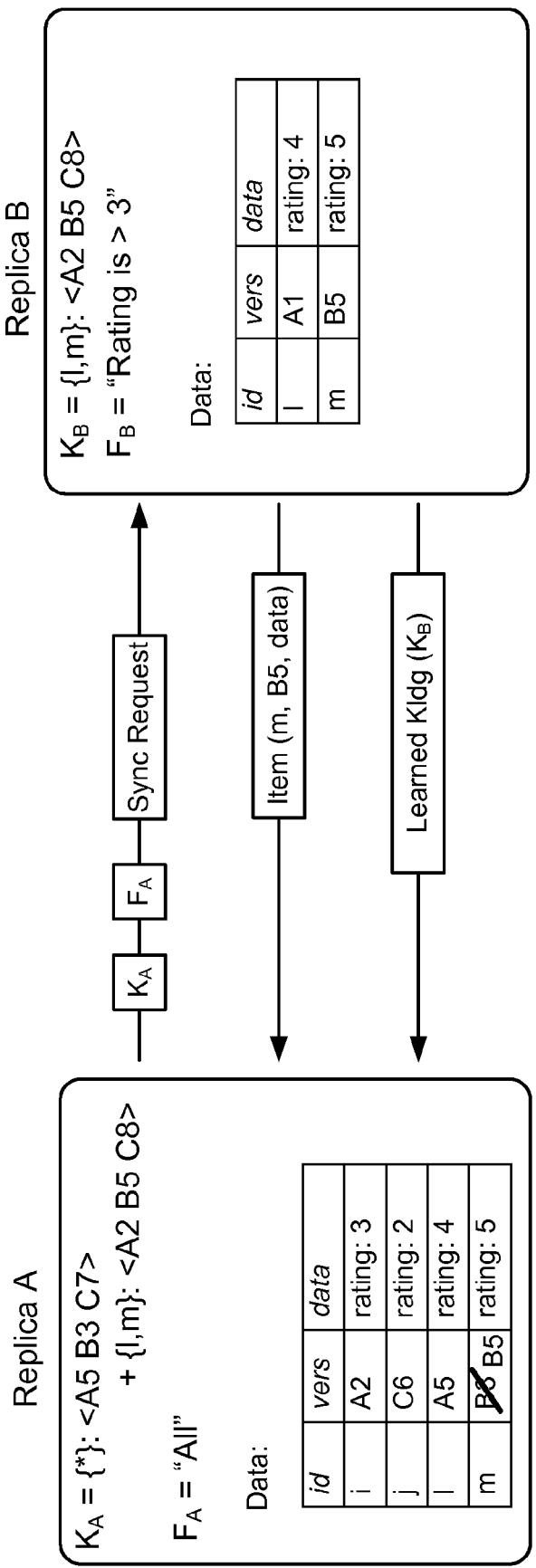
FIG. 7 shows the replicas A and B of FIG. 6 after the one-way synchronization operation according to the present system.

Upon requesting the sync, replica A sends its knowledge, $K_A$ and its filter, $F_A$. Replica B learns that replica A is unaware of version B5 and determines that the item with this version matches replica A's filter. Therefore, replica B returns version B5 and associated data to replica A. As shown in FIG. 7, the version B3 in replica A is updated to B5. In the process of adding version B5 to its data store, replica A may detect an update conflict using known techniques for conflict detection. Known conflict resolution techniques may be applied in cases where neither update to a given item is the most recent.

Lastly, replica B returns the learned knowledge $K_B$. That is, as shown in FIG. 7, replica A learns about versions in $K_B$ for items l and m. Thus after the sync, as shown in FIG. 7, replica A has two knowledge fragments:

$K_A = \{*\}:<A5B3C7>+\{l,m\}:<A2B5C8>$.

This process may be repeated for each synchronization between replicas within the collection. In this example, replica B returned its complete knowledge as learned knowledge. However, in general, a replica should only return learned knowledge for items it stores that match the requesting replica's filter or for versions of items that it knows do not match the filter.

Synchronization between replicas may cause a replica's knowledge to partition into multiple knowledge fragments for subsets of items in the original item-set. For example, as seen in FIGS. 6 and 7, if replica A synchronizes with replica B interested in a subset of items of replica A's interest, then an item-set in replica A's knowledge may split into two sets, one covering the updates received from replica B and another for items not known to replica B.

Similarly, synchronization may cause multiple knowledge fragments to be discarded and/or merged into a single fragment with an item-set covering all the items in the original item-sets. For example, if replica B in the previous example synchronizes with replica A and replica A has a knowledge fragment that includes all of replica B's items with superior knowledge, then replica B could just replace its knowledge with the single fragment received from replica A. Table 2 below specifies how a replica may merge or reduce the size of two knowledge fragments, one knowledge fragment with item-set $S_1$ and knowledge vector $K_1$ and a second knowledge fragment with item-set $S_2$ and knowledge vector $K_2$.

TABLE 2

| | $S_1:K_1 + S_2:K_2 \Rightarrow$ | | | |
|---|---|---|---|---|
| | $S_1 \subset S_2$? | $S_1 = S_2$? | $S_2 \subset S_1$? | $S_1 \neq S_2$? |
| $K_1 \subset K_2$? | $S_2:K_2$ | $S_2:K_2$ | $S_2:K_2 + S_1 - S_2:K_1$ | $S_2:K_2 + S_1 - S_2:K_1$ |
| $K_1 = K_2$? | $S_2:K_2$ | $S_1:K_1$ | $S_1:K_1$ | $S_1 \cup S_2:K_1$ |
| $K_2 \subset K_1$? | $S_1:K_1 + S_2 - S_1:K_2$ | $S_1:K_1$ | $S_1:K_1$ | $S_1:K_1 + S_2 - S_1:K_2$ |
| $K_1 \neq K_2$? | $S_1:K_1 \cup K_2 + S_2 - S_1:K_2$ | $S_1:K_1 \cup K_2$ | $S_2:K_1 \cup K_2 + S_1 - S_2:K_1$ | $S_1:K_1 + S_2:K_2$ |

Operations on $S_1$ and $S_2$ represent standard set operations and operations on $K_1$ and $K_2$ represent standard knowledge vector operations, except that $\neq$ is used to mean "incomparable", that is, neither includes the other. Where $K_2$ properly includes $K_1$ ($K_2$ "dominates" $K_1$), and $S_2$ includes $S_1$, the $S_1:K_1$ knowledge fragment may be discarded and the result is $S_2:K_2$ (first row, first and second columns of table 2). Vice-versa where $K_1$ dominates $K_2$ and $S_1$ includes $S_2$ (third row, second and third columns). Where $K_1$ equals $K_2$ and $S_2$ dominates $S_1$, the resulting knowledge fragment is $S_2:K_2$ (second row, first column). Where $K_1$ equals $K_2$ and $S_1$ includes $S_2$, the resulting knowledge fragment is $S_1:K_1$ (second row, second and third columns). The remaining possible additive combinations result in some union or subtraction of either the items-sets or knowledge vectors, except for the case where $K_1$ and $K_2$ are incomparable and $S_1$ and $S_2$ are incomparable. In this case (fourth row, fourth column), there is no discard or merge and the resulting knowledge fragment is $S_1:K_1+S_2:K_2$. A union on two knowledge vectors (such as for example in the fourth row, first column) results in a new knowledge vector with the highest numbered version in the two vectors for each replica. Examples of synchronization and subsequent defragmentation of knowledge fragments is set forth in U.S. patent application Ser. No. 11/751,478, previously incorporated by reference.

Figure 8:
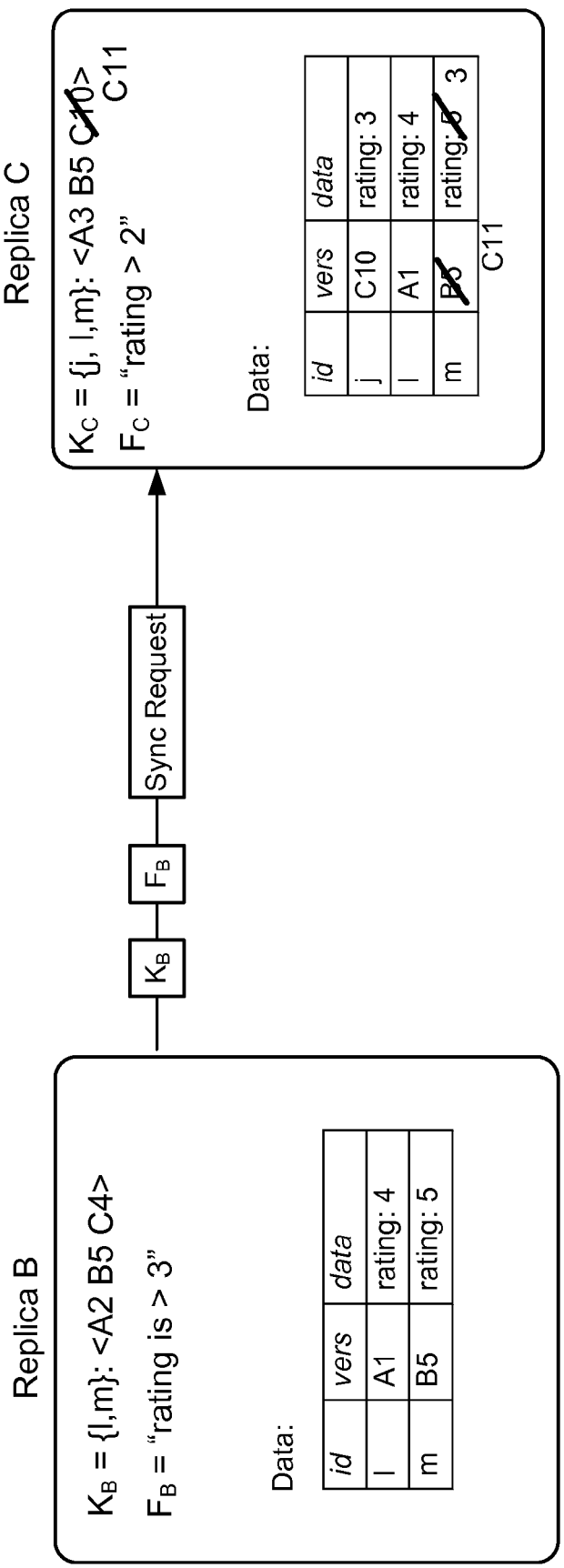
FIG. 8 shows replica B requesting a one-way synchronization operation with a replica C, where replica C includes an item that has moved out of the interest set of replica B due to a change in the item.

As indicated above, a concern in a system for synchronizing partial replicas is the so-called move-out scenario, where a replica must be notified that an item has moved out of its interest set due to an update to the item. Such a scenario is illustrated in FIG. 8. In FIG. 8, replica C updates item m to change its rating from a 5 to a 3. The version of item m is updated as C11 as shown in FIG. 8. Replica B has filter $F_B$ of "rating is >3," and has item m stored with its outdated rating of 5. Upon replica C changing item m from a rating of 5 to a rating of 3, item m now falls outside of the interest set of replica B. However, unless replica B receives some notification that item m has changed, the old value for item m will improperly remain within replica B.

Figure 9:
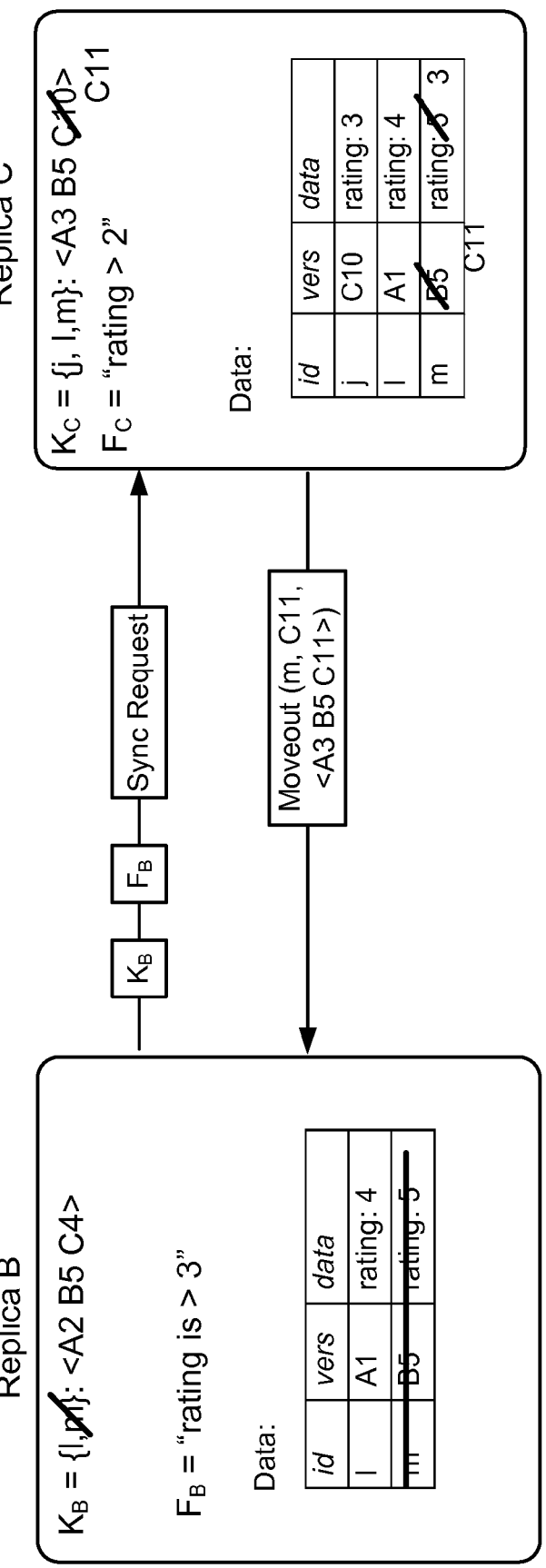
FIG. 9 shows the one-way synchronization between replicas B and C of FIG. 8, including a move-out notification being sent to replica B.

According to embodiments of the present system, as shown in FIG. 9, when an item moves out of the interest set of a replica due to an update elsewhere, that replica receives notification of that move-out. As shown in FIG. 9, upon receiving the sync request, knowledge fragment and filter from replica B, replica C returns a move-out notification. The move-out notification includes the ID of the item which has been modified to be outside of the interest set of replica B, the version number of the update and the knowledge from the source replica C. Thus, in the embodiment of FIG. 9, the move-out notification sends item m, version C11, and knowledge vector <A3 B5 C11>. Including replica C's knowledge in the move-out notification allows replica B to determine whether the indicated version of item m is newer than the version that it currently stores.

Replica B receives the move-out notification, determines that its version of item m (version B5) is included in replica C's knowledge, and, in embodiments, removes item m from its data as shown in FIG. 9. Replica B also removes item m from its knowledge as shown in FIG. 9.

Figure 10:
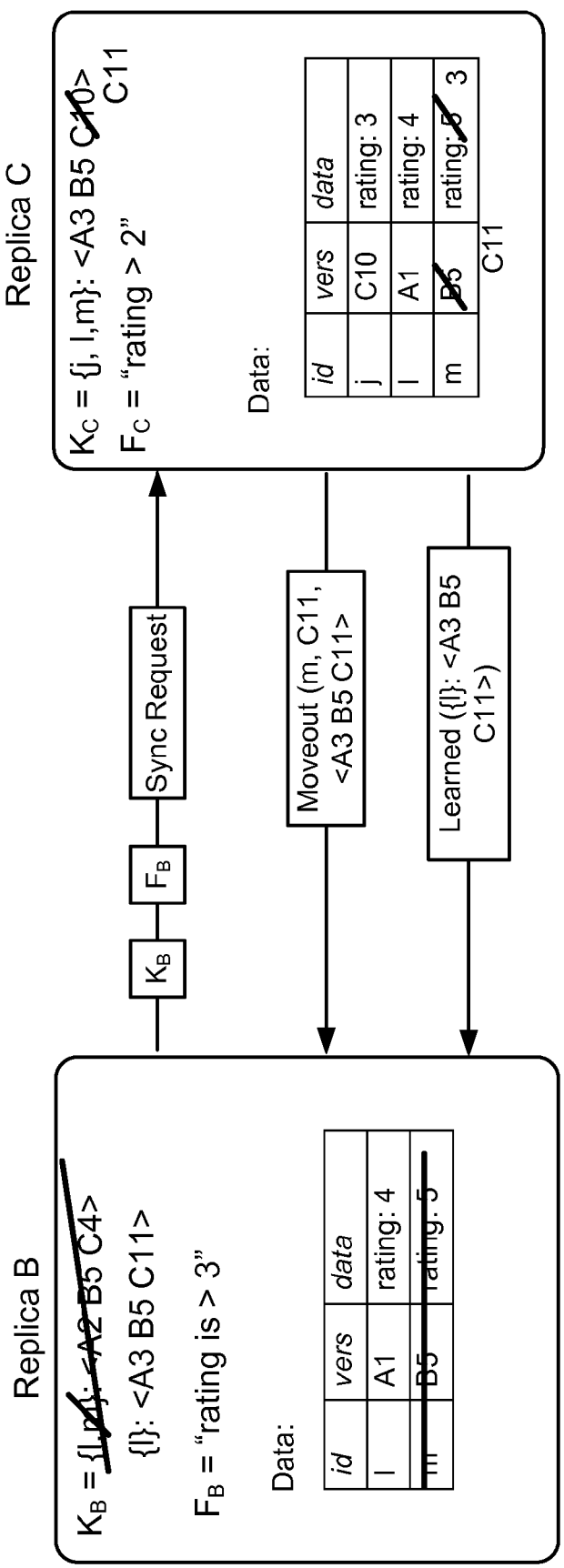
FIG. 10 shows the one-way synchronization between replicas B and C of FIG. 8, including learned knowledge being sent to replica B.

Referring now to FIG. 10, after sending the move-out notification, the source replica may then send its learned knowledge as described above. In the example of FIGS. 8 through 10, replica C would send learned knowledge of: {l}: <A3 B5 C11>. Items j and m from replica C are not sent in the learned knowledge in this embodiment, as their rating falls outside of the interest set defined by the filter $F_B$ in replica B. The knowledge fragment $K_B$ in replica B is thus updated to {l}: <A3 B5 C11> as shown in FIG. 10.

In summary, a source replica will send a move-out notification to a target replica during synchronization if: 1) the source replica stores the item, 2) the source replica's knowledge of the item dominates the target replica's knowledge (meaning that the source replica has an updated version), and 3) the source replica's version of the contents are outside of the interest set defined by the target replica's filter. Although this description and the accompanying figures presents move-out notifications in the context of a synchronization protocol utilizing item-set knowledge, it should be evident that move-outs are needed in any system involving partial replicas defined by filters and that these three conditions for sending move-out notifications during synchronization can apply to a wide variety of protocols. Alternative embodiments may provide move-out notifications for systems that rely on per-item version vectors, operation logs, multicast, two-way synchronization, or other replication mechanisms.

Figure 11:
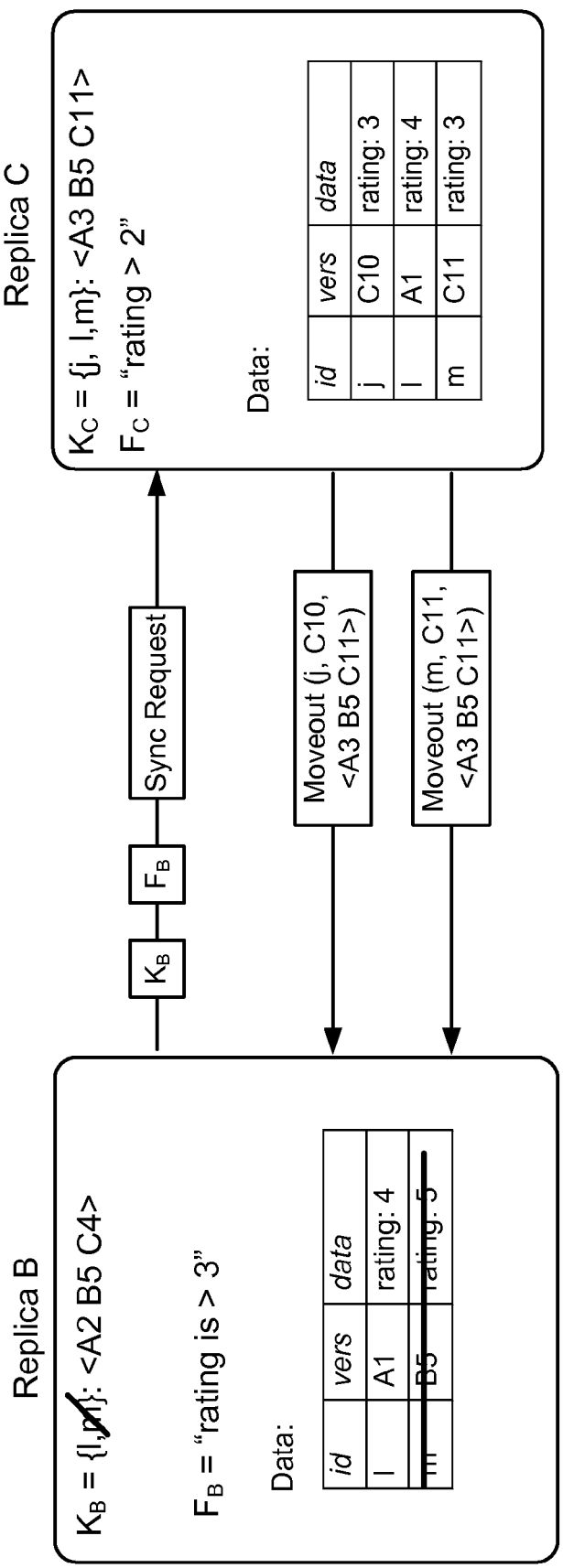
FIG. 11 shows a one-way synchronization between replicas B and C, where replica C sends a move-out notification without full knowledge of the items stored in replica B.

One issue involving move-out notifications is that the source replica, the replica sending move-outs, may not be fully aware of the items that are stored by the target replica. As shown in FIG. 11, when partial replica B synchronizes from replica C, replica C may have multiple items that have been recently updated and that do not match replica B's filter. In this figure, both item j with version C10 and item m with version C11 are not included in replica B's knowledge and are not of interest to replica B. Replica C may be able to deduce from replica B's knowledge that replica B stores item m but not j, but this sort of deduction is not generally possible. In this figure, replica C simply sends move-out notifications for all items that meet the three conditions listed above. That is, replica C sends to replica B move-out notifications from both item j and m even though replica B does not store item j and possibly never did. This is not incorrect since the receiving replica can ignore move-out notifications for items that it does not store. But sending unnecessary move-out notifications does consume network resources.

Figure 12:
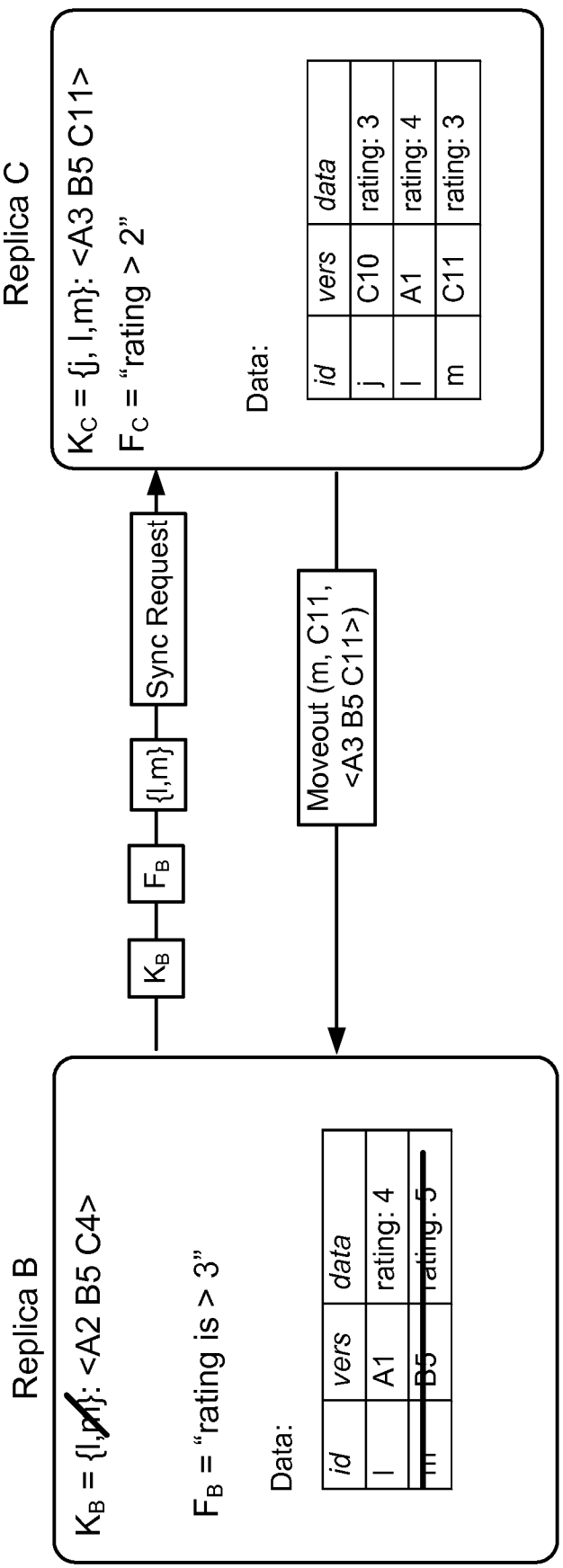
FIG. 12 shows a one-way synchronization between replicas B and C according to an embodiment where replica B sends a complete set of identifiers for the items that it stores.

To avoid unnecessary move-out notifications, the replica initiating synchronization could optionally send a complete set of identifiers for the items that it stores as shown in FIG. 12. In this case, when requesting synchronization with replica C, replica B indicates that it stores items l and m. Replica C can then determine that it need not send a move-out notification for item j even though this item was recently updated and does not match replica B's filter. Most likely, this item did not match B's filter even before it was updated, which explains why replica B does not store it. One concern about this approach is that the set of items stored by a replica could be large, thereby requiring a partial replica to send lots of data for each sync request. The item list can be compacted using traditional compression algorithms or could be encoded as a Bloom filter. Using Bloom filters, false positives may cause the source replica to send move-out notifications for items that the target replica does not actually store. That is okay since the receiving replica will simply ignore these unnecessary move-outs, as discussed above.

Move-out notifications may also be needed in situations where the source replica during synchronization no longer stores an item that has been updated. Consider the case where replica C updates item m (as in FIG. 9) that is stored by both replicas B and D, causing that item to no longer match B's filter or D's filter. When B syncs from C, as in FIG. 9, replica C, using the rules stated above, generates and sends replica B a move-out notice for item m. Replica B then discards the item from its data store. When replica D later syncs from replica B, as shown in FIG. 13, replica B no longer stores the item (or any metadata for it) and, hence, cannot generate a move-out notice for D using the techniques previous discussed.

Figure 13:
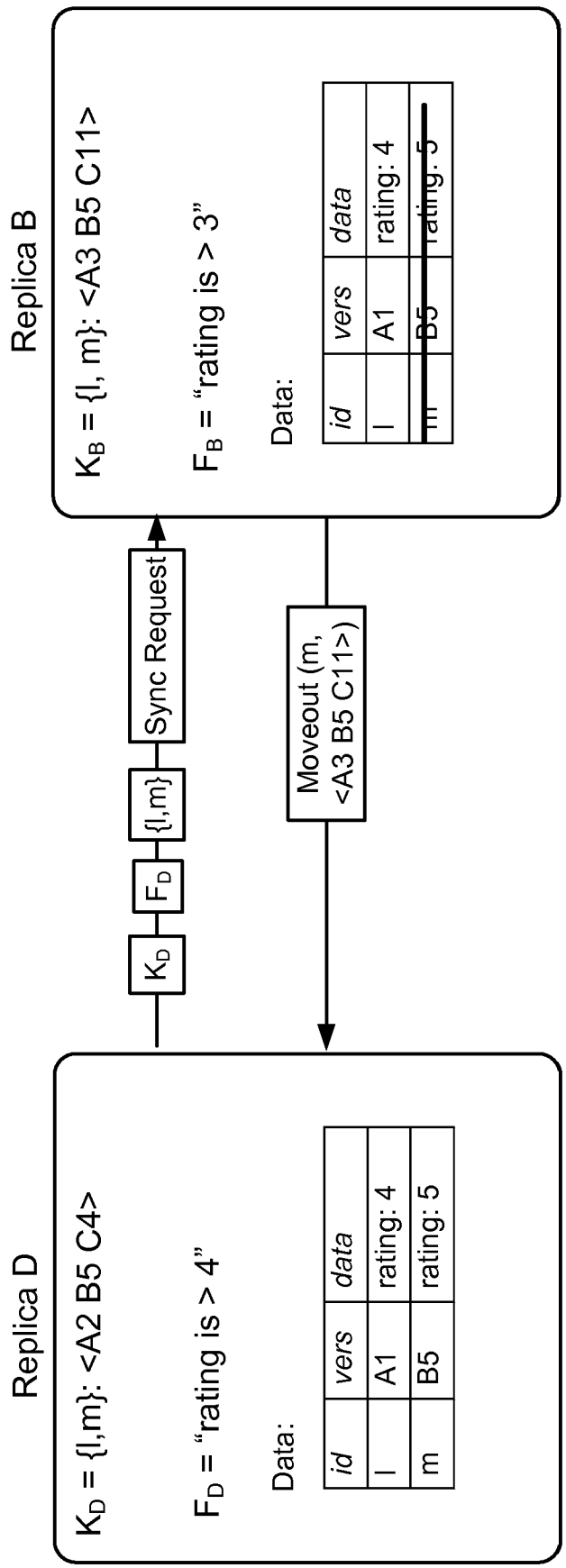
FIG. 13 shows a one-way synchronization between replicas D and B according to a further embodiment for generating move-out notifications.

FIG. 13 shows a second method for generating move-out notifications that deals with this situation. In FIG. 13, replica B is in the state it would be in following the synchronization depicted in FIG. 16. When it receives a sync request from replica D, replica B can determine that replica D stores item m but should not since replica B does not also store this item and replica D is interested in fewer items than replica B, namely items with a rating above 4. In particular, a source replica can inform a target replica of a move-out for some item if: 1) the source replica does not store the item, 2) the source replica's filter is no more restrictive than the target replica's filter and 3) the source replica's knowledge of the item dominates the target replica's knowledge of the item. Since in this case the source replica does not store the item, its knowledge of the item must necessarily be class II knowledge, meaning that the source replica knows that the updated version of the item does not match its filter. Because the source replica's filter is no more restrictive than the target replica's, the updated version of the item cannot match the target's filter either.

Thus, two sets of conditions have been disclosed under which a source replica can generate move-out notifications during synchronization. One method covers the case where the source stores an updated item that does not match the target replica's filter. The second method deals with the case where the source replica, which is also a partial replica, does not store an item that is currently stored at the target replica but should not be. An alternative method is possible if a replica knows the complete set of filters that are used by its sync partners. In this case, each replica can explicitly keep track of updates that result in move-outs from this set of filters. Let Fset be the set of filters for which move-out notifications are desired. For each local update and for each new version obtained during sync, the replica checks whether the update causes an item that previously matched some filter F in Fset to stop matching the filter. If so, then the replica generates and stores a "filter tombstone" recording the item's ID, item version and made-with knowledge (or version vector), and filter F. The item's version and made-with knowledge must be included in the filter tombstone, i.e. move-out notification, since subsequent updates to the item may cause it to once again match the filter; the version information allows replicas to detect obsolete filter tombstones. When sending items during synchronization with a partner that uses filter F, the replica also sends filter tombstones for filter F that are not already known to the sync partner. Unfortunately, this approach not only requires replicas to explicitly store and garbage collect filter tombstones, but also it does not work well for changing filters. Thus, this patent focuses on methods that work for arbitrary filters and arbitrary synchronization topologies.

Figure 14:
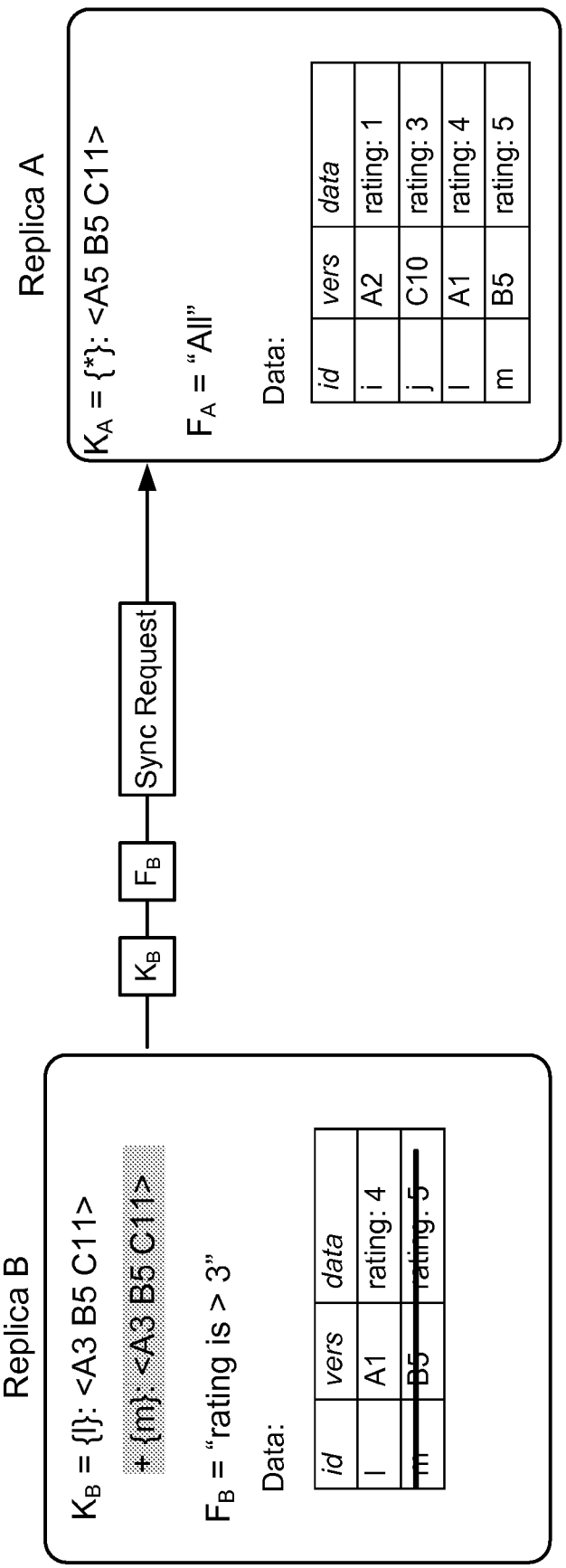
FIG. 14 illustrates a one-way synchronization between replicas B and A, illustrating a potential problem of an outdated item being reincarnated within to a replica.

The above-described system operates effectively to provide move-out notification to all replicas in a weakly consistent distributed collection. However, the above-described methodology does not, by itself, address the issue of item reincarnation in a partially replicated weakly consistent distributed collection. The problem of item reincarnation is illustrated in FIG. 14. In FIG. 14, replica B is shown after the sync operation and move-out notification with replica C described with respect to FIGS. 8 through 10. Replica B next requests a one-way synchronization operation with replica A. As shown, replica A has not yet learned of the update to item m. If the sync operation were allowed to go forward using only the information known to replicas A and B indicated in FIG. 14, an outdated version of item m would be reincarnated in replica B.

Figure 15:
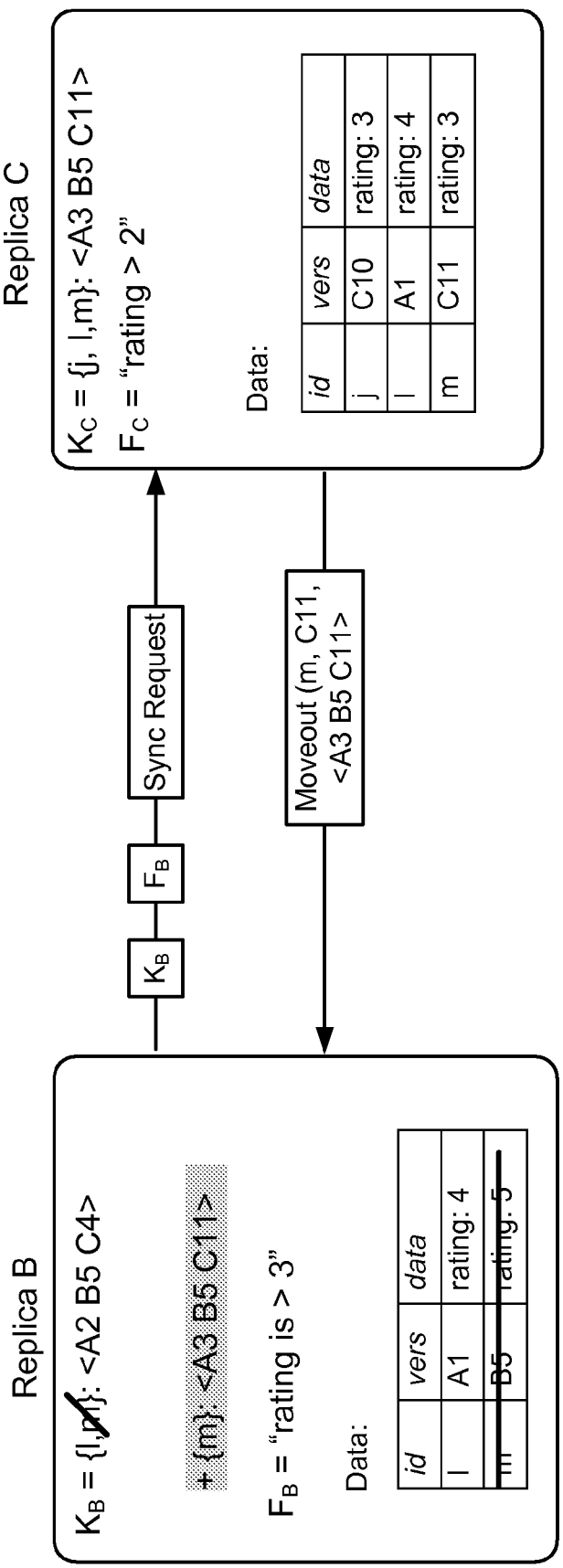
FIG. 15 shows the one-way synchronization between replicas B and C including a move-out notification being sent to replica B as in FIG. 8, and further including replica B storing class II knowledge of the move-out.

Accordingly, referring now to FIG. 15, when replica C sends the move-out notification as described above with respect to FIG. 9, and item m is removed from the interest set of stored data in replica B, a knowledge fragment representing item m is instead stored as class II knowledge in replica B. Class II knowledge is represented with shaded text in FIGS. 15 through 18. As described above, a replica holds knowledge about items that it currently stores. This first type of knowledge is called class I knowledge. In addition, a partial replica may maintain knowledge about items that it does not store, referred to herein as class II knowledge. A replica may store class II knowledge for an item where the current version of the item is outside the interest set of the replica. As an alternative embodiment, a partial replica may store a "place holder" to represent an item that is outside its interest set. In this alternative embodiment, knowledge of place holders corresponds to class II knowledge.

Class I and class II knowledge may be stored in separate knowledge fragments. An alternative embodiment may permit a knowledge fragment to combine both class I and class II knowledge. Because class I knowledge relates to items that the replica stores whereas class II knowledge relates to items that the replica does not store, a knowledge fragment may always be separated into class I and class II knowledge by reference to the identifiers of items that are actually stored in the replica.

Storing class II knowledge prevents the reincarnation scenario shown in FIG. 9 by preventing items currently outside of the interest set of a partial replica from being received from other replicas in subsequent synchronization operations. Without class II knowledge, an out-of-date sending replica could send the partial replica an old version of an item that subsequently was updated and removed from the partial replica's interest set. By maintaining class II knowledge, the partial replica remains aware of the update, even though it does not store the item, and thus can prevent the old version from reincarnating in its data store. If and when an item's rating changes to fall within a replica's interest set, then the item is stored in the replica and moved from the class II knowledge for that replica to class I knowledge for that replica.

Since no item is outside the interest set of a full replica, a full replica has no need for class II knowledge.

According to embodiments of the present system, as shown in FIG. 15, upon item m being modified to be outside of the interest set of replica B, when replica B receives the move-out notification, item m is removed from the data store of replica B. Additionally, knowledge fragment $K_B$ is updated to include class II knowledge of the removal ({m}: <A3 B5 C11>).

Figure 16:
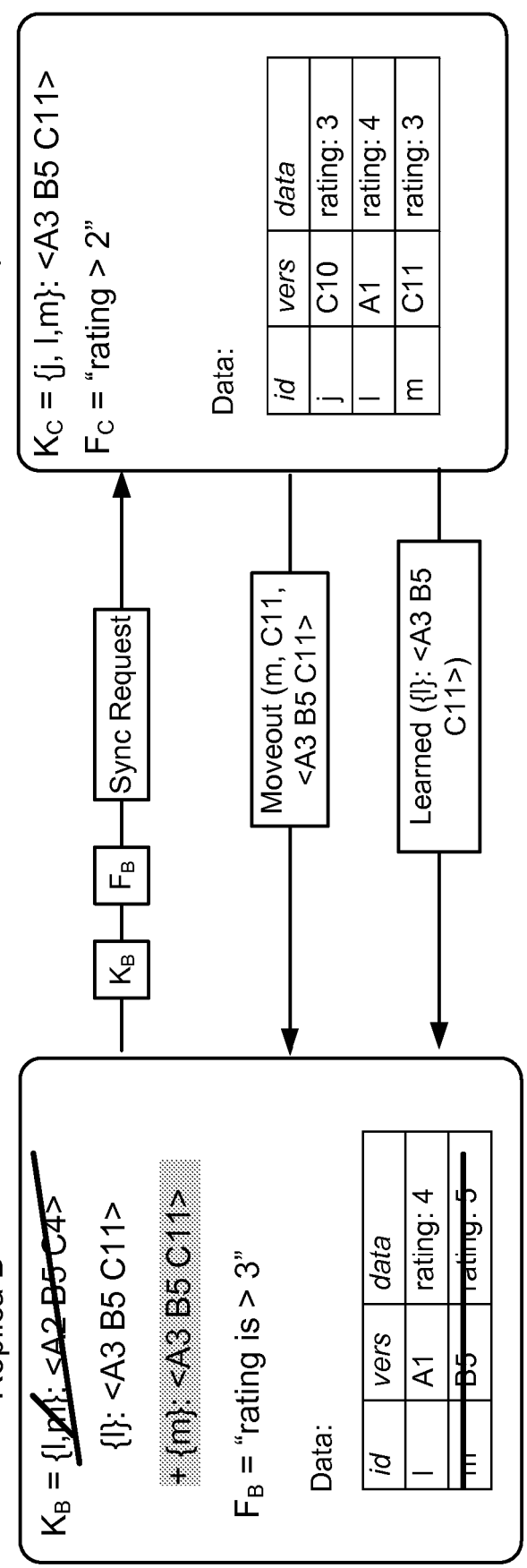
FIG. 16 shows the one-way synchronization between replicas B and C of FIG. 12, including learned knowledge being sent to replica B.

Thereafter, as shown in FIG. 16, the sync operation is completed by replica B receiving the learned knowledge from replica C. The learned knowledge is added to replica B's knowledge, resulting in:

$$K_B = \{l\}: <A3B5C11>(\text{class I knowledge}) + \{m\}: <A3B5C11>(\text{class II knowledge}).$$

If the embodiment permits combining class I and class II knowledge into the same knowledge fragment, these fragments could be combined as is set forth in U.S. patent application Ser. No. 11/751,478, previously incorporated by reference.

After the sync operation shown in FIG. 16, replica B may next request to synchronize with replica A. As explained above, replica B initiates a sync operation by sending a sync request as well as its knowledge and filter to replica A. The knowledge sent by replica B includes both class I knowledge and class II knowledge.

Figure 17:
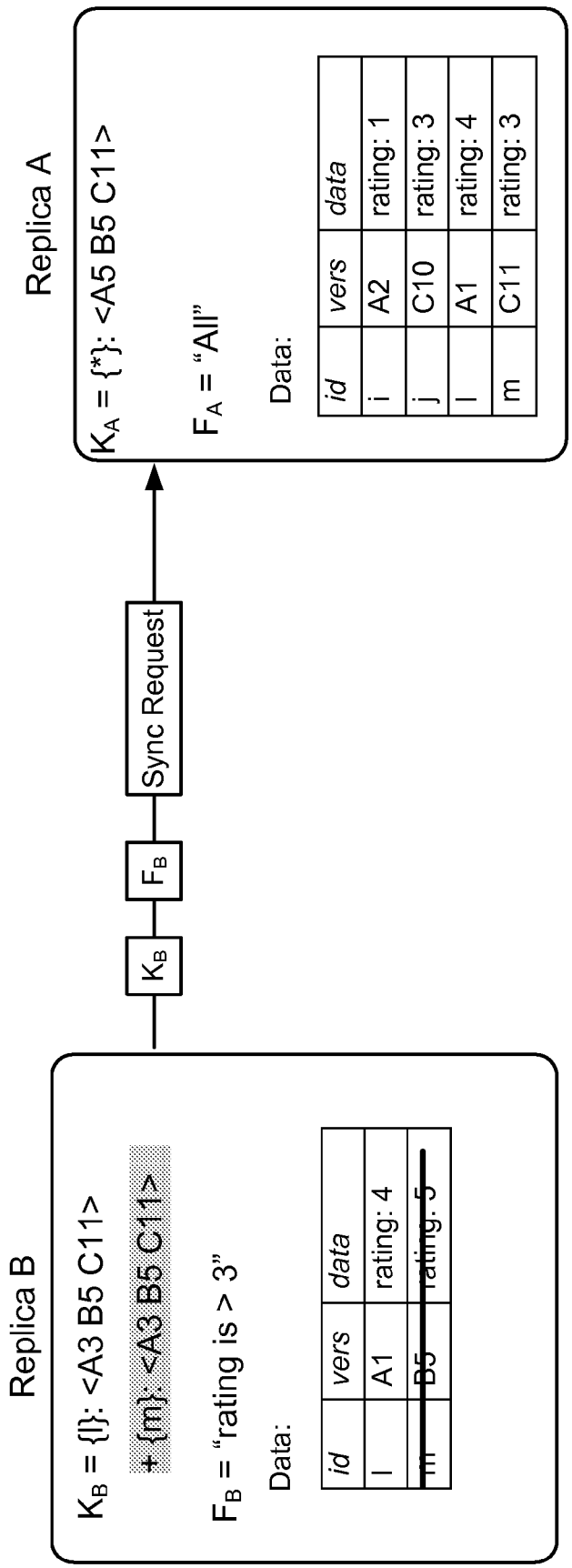
FIG. 17 shows a one-way synchronization operation between replicas B and A where class II knowledge from replica B indicates that replica A does not need to send a move-out notification.
Figure 18:
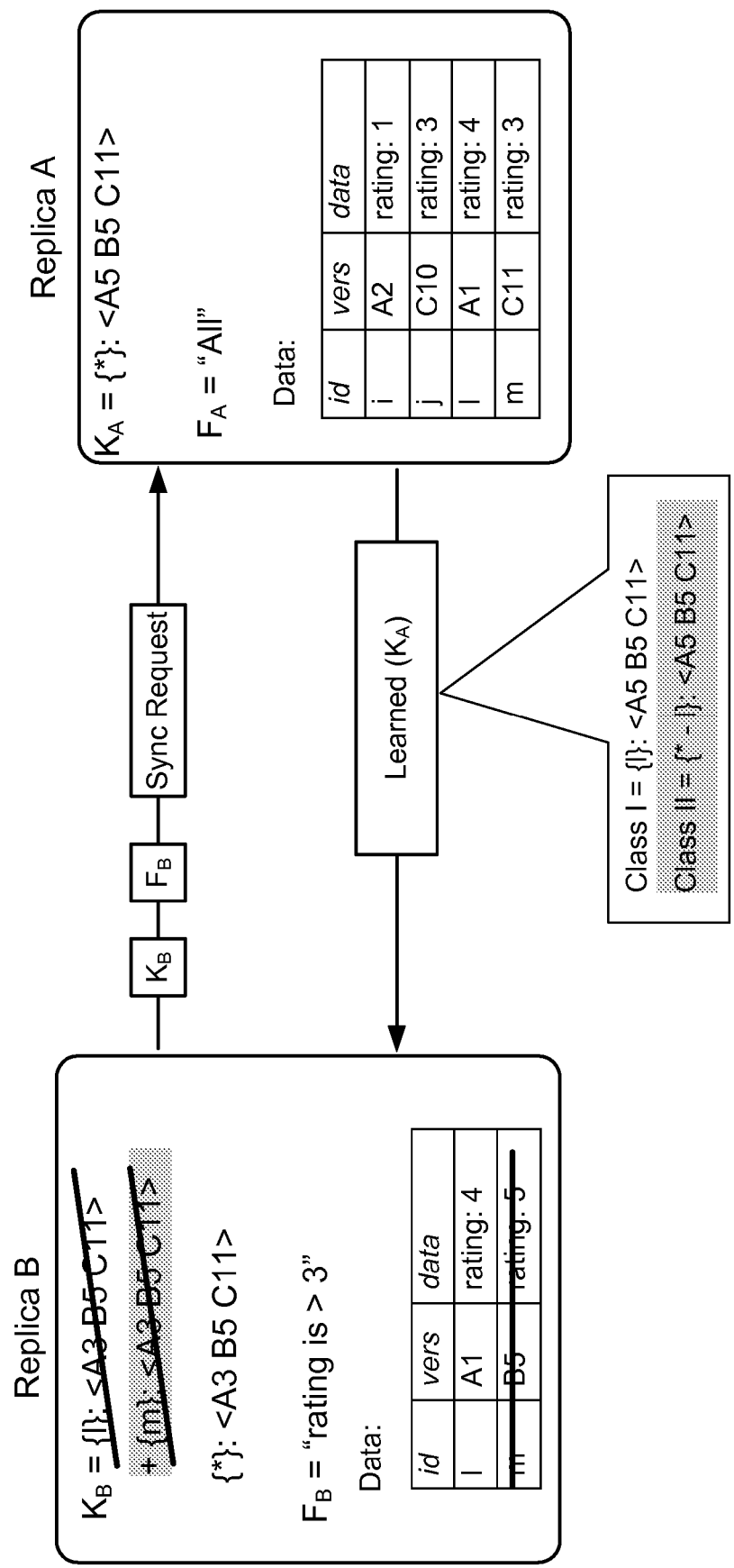
FIG. 18 shows the one-way synchronization between replicas B and A of FIG. 14, including learned class I and class II knowledge being sent to replica B.

Source replica A then returns any versions of which it is aware and which replica B is not (there are no such versions in the example of FIGS. 17 and 18). As shown in FIG. 18, replica A then sends its learned knowledge. Viewing replica B's filter of $F_B$ equal "rating is >3" the only item in replica A which falls within the interest set of replica B is item 1. Accordingly, replica A returns as class I learned knowledge the knowledge vector associated with item 1: {l}: <A5 B5 C11>. The remaining items in replica A all are outside of the interest set of replica B. However, in accordance with this embodiment, these items are all sent to replica B as class II learned knowledge: {*-l}: <A5 B5 C11> (this class II knowledge could alternatively be represented as all items other than l, or {i,j,m}: <A5 B5 C11>).

As shown in FIG. 18, the knowledge fragment $K_B$ (including both class I and class II knowledge) is updated by the learned knowledge from replica A (which also contains both class I and class II knowledge). As replica A has star knowledge, when replica B synched with replica A, it received knowledge of all items in the collection. Any items it did not receive was because they were outside of replica B's interest set. For these items, class II knowledge may be sent to replica B as shown. However, given that replica A has star knowledge, the class II knowledge previously held in replica B may be discarded, and the updated knowledge fragment in replica B simplifies to replica B having knowledge of versions A3, B5, and C11 for all items in the collection: {*}: <A3 B5 C11>.

Figure 19:
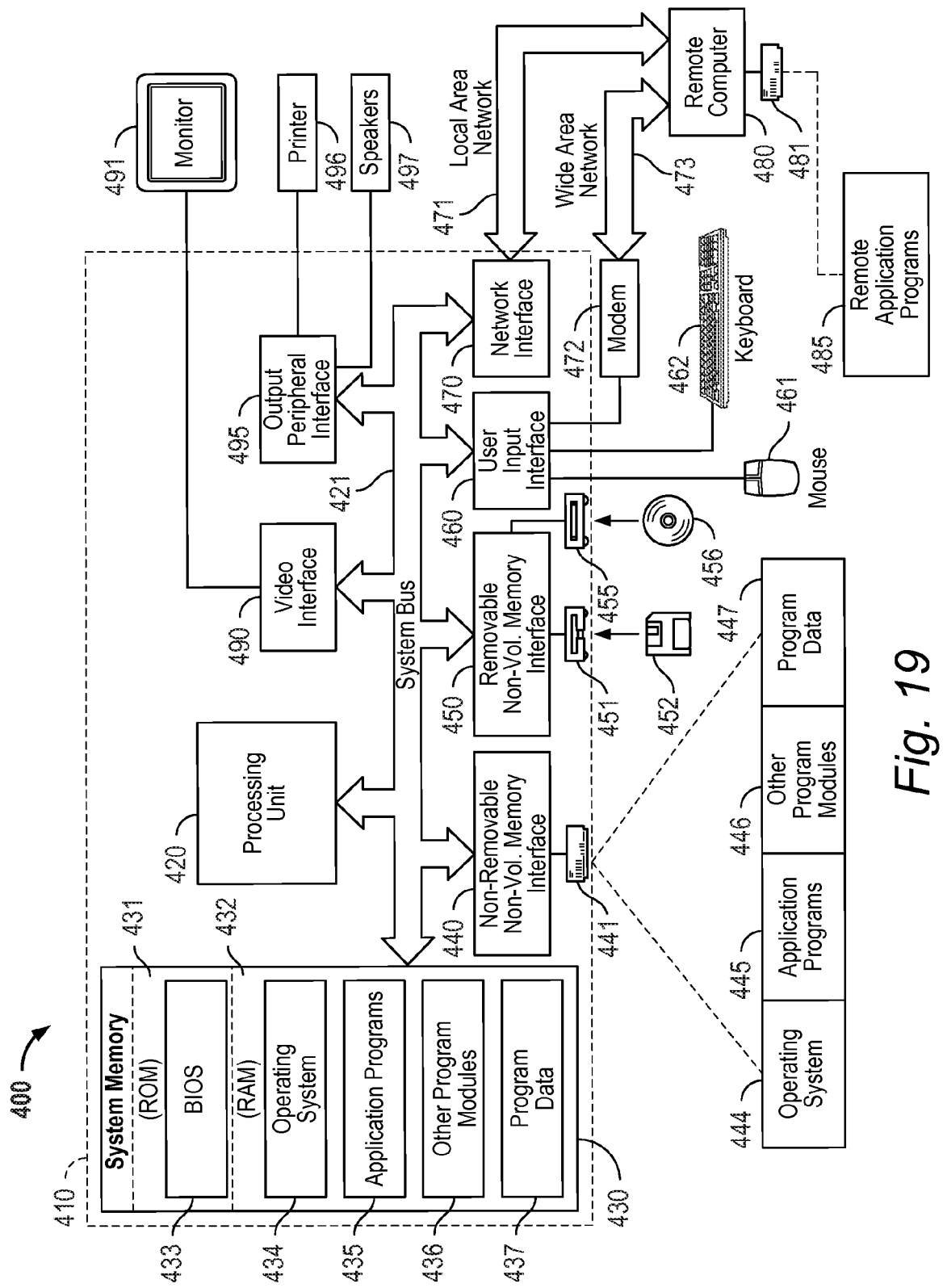
FIG. 19 is a block diagram of a computing system environment according to an embodiment of the present system.

FIG. 19 illustrates an example of a suitable general computing system environment 400 for implementing a replica. It is understood that the term "computer" as used herein broadly applies to any digital or computing device or system. The computing system environment 400 is only one example of a suitable computing environment and is not intended to suggest any limitation as to the scope of use or functionality of the inventive system. Neither should the computing system environment 400 be interpreted as having any dependency or requirement relating to any one or combination of components illustrated in the exemplary computing system environment 400.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 19, an exemplary system for implementing the inventive system includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 may include a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 430 includes computer storage media in the form of volatile and/or nonvolatile memory such as ROM 431 and RAM 432. A basic input/output system (BIOS) 433, containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 19 illustrates operating system 434, application programs 435, other program modules 436, and program data 437.

The computer 410 may also include other removable/non-removable, volatile/nonvolatile computer storage media. By way of example only, FIG. 19 illustrates a hard disc drive 441 that reads from or writes to non-removable, nonvolatile magnetic media and a magnetic disc drive 451 that reads from or writes to a removable, nonvolatile magnetic disc 452. Computer 410 may further include an optical media reading device 455 to read and/or write to an optical media 456.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 441 is typically connected to the system bus 421 through a non-removable memory interface such as interface 440. Magnetic disc drive 451 and optical media reading device 455 are typically connected to the system bus 421 by a removable memory interface, such as interface 450.

The drives and their associated computer storage media discussed above and illustrated in FIG. 19, provide storage of computer readable instructions, data structures, program modules and other data for the computer 410. In FIG. 19, for example, hard disc drive 441 is illustrated as storing operating system 444, application programs 445, other program modules 446, and program data 447. These components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and a pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 19. The logical connections depicted in FIG. 19 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communication over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 19 illustrates remote application programs 485 as residing on memory device 481.

It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A computer implemented method of synchronizing a plurality of replicas having a collection of items, the plurality of replicas including a target replica having a first interest set of items, and the plurality of replicas including a source replica having a second interest set of items, the method comprising the steps of:
   (a) storing representations of items that are known to the target replica in the target replica;
   (b) receiving a sync request from the target replica at the source replica, said request indicating versions of items known to the target replica;
   (c) transmitting from the source replica to the target replica at least one item-set knowledge fragment, the at least one item-set knowledge fragment indicating versions of items which are not known to the target replica; and
   (d) transmitting from the source replica to the target replica a notification of a changed item if a set of predetermined conditions are met, the item falling within the first interest set of the target replica prior to the change in the item, and the item not falling within the first interest set of the target replica after the change in the item.

2. A computer implemented method as recited in claim 1, wherein said step (d) of transmitting from the source replica to the target replica a notification of a changed item if a set of predetermined conditions are met comprises the step of transmitting the notification if:
   (i) the source replica stores the item,
   (ii) the source replica's version of the item is more recent than the target replica's version of this item, and
   (iii) the source replica's version of the item is outside of the first interest set of the target replica.

3. A computer implemented method as recited in claim 1, wherein said step (d) of transmitting from the source replica to the target replica a notification of a changed item if a set of predetermined conditions are met comprises the step of transmitting the notification if:
   (i) the source replica does not store the item,
   (ii) a filter in the source replica defining the second item set is no more restrictive than a filter in the target replica defining the first item set, and
   (iii) the source replica's last known version of the item is more recent than the target replica's version of the item.

4. A computer implemented method as recited in claim 1, said step (d) of transmitting a notification of a changed item comprising the step of transmitting a unique identifier of the item that has changed and the version in which the item was changed.

5. A computer implemented method as recited in claim 1, further comprising the step (e) of removing the changed item from a database of stored items in the target replica upon receipt of the notification transmitted in said step (d).

6. A computer implemented method as recited in claim 1, wherein the items that are known to the target replica in step (a) include items stored in the target replica.

7. A computer implemented method as recited in claim 1, wherein the items that are known to the target replica in step (a) include items not stored in the target replica but known to the target replica as not being within the first interest set of the target replica.

8. A computer implemented method of synchronizing a plurality of replicas having a collection of items, the plurality of replicas including a target replica having a first interest set of items, and the plurality of replicas including a source replica having a second interest set of items, the method comprising the steps of:
   (a) storing in the target replica one or more knowledge fragments representing versions of items within the first interest set of items in the target replica;
   (b) storing in the target replica one or more knowledge fragments representing versions of items not within the first interest set of items in the target replica;
   (c) receiving a sync request from the target replica at the source replica, said request containing a plurality of item-set knowledge fragments, said plurality of item-set knowledge fragments indicating versions of items of which the target replica is aware and which are within the first interest set of items, and said plurality of item-set knowledge fragments indicating versions of items not within the first interest set of items stored in said step (b);
   (d) transmitting from the source replica to the target replica versions of items which are not known to the target replica and which are not represented by the one or more knowledge fragments stored in said step (a) or (b);
   (e) transmitting from the source replica to the target replica a plurality of item-set knowledge fragments, said plurality of item-set knowledge fragments indicating versions of items learned by the target replica; and
   (f) transmitting from the source replica to the target replica a notification of a changed item if a set of predetermined conditions are met, the item falling within the first interest set of the target replica prior to the change in the item, the item not falling within the first interest set of the target replica after the change in the item, and the changed version of the item not being known to the target replica.

9. A computer implemented method as recited in claim 8, wherein said step (f) of transmitting from the source replica to the target replica a notification of a changed item if a set of predetermined conditions are met comprises the step of transmitting the notification if:
   (i) the source replica stores the item,
   (ii) the source replica's knowledge of the item dominates the target replica's knowledge, and
   (iv) the source replica's version of the item is outside of the first interest set of the target replica.

10. A computer implemented method as recited in claim 8, wherein said step (f) of transmitting from the source replica to the target replica a notification of a changed item if a set of predetermined conditions are met comprises the step of transmitting the notification if:
   (i) the source replica does not store the item,
   (ii) a filter in the source replica defining the second item set is no more restrictive than a filter in the target replica defining the first item set, and
   (iii) the source replica's knowledge of the item dominates the target replica's knowledge of the item.

11. A computer implemented method as recited in claim 8, further comprising the step (g) of removing the changed item from a database of stored items in the target replica upon receipt of the notification transmitted in said step (f).

12. A computer implemented method as recited in claim 8, further comprising the step (h) of transmitting from the target replica to the source replica as part of the sync request an explicit list of identifiers for the items that are currently stored at the target replica so that the source replica can avoid returning notifications for items that are not stored at the target replica.

13. A computer implemented method of synchronizing a plurality of replicas having a collection of items, the plurality of replicas including a target replica having a first interest set of items, and the plurality of replicas including a source replica having a second interest set of items, the method comprising the steps of:
  (a) storing in the target replica one or more knowledge fragments representing both versions of items within the first interest set of items in the target replica and versions of items not within the first interest set of items in the target replica;
  (b) receiving a sync request from the target replica at the source replica, said request containing a plurality of item-set knowledge fragments, said plurality of item-set knowledge fragments indicating versions of items of which the target replica is aware and which are within the first interest set of items, and said plurality of item-set knowledge fragments indicating versions of items not within the first interest set of items stored in said step (a);
  (c) transmitting from the source replica to the target replica versions of items which are not known to the target replica and which are not represented by the one or more knowledge fragments stored in said step (a);
  (d) transmitting from the source replica to the target replica a plurality of item-set knowledge fragments indicating versions of items learned by the target replica and within the first interest set of the target replica and versions of items learned by the target replica and not within the first interest set of the target replica.

14. A computer implemented method as recited in claim 13, wherein the plurality of item-set knowledge fragments transmitted in said step (d) are added to the one or more knowledge fragments stored in said step (a).

15. A computer implemented method as recited in claim 13, further comprising the step (e) of transmitting from the source replica to the target replica a notification of a changed item, the item falling within the first interest set of the target replica prior to the change in the item, and the item not falling within the first interest set of the target replica after the change in the item.

16. A computer implemented method as recited in claim 15, further comprising the step (f) of removing the changed item from a database of stored items in the target replica upon receipt of the notification transmitted in said step (e).

17. A computer implemented method as recited in claim 16, further comprising the step of transmitting from the target replica to the source replica as part of the sync request an explicit list of identifiers for the items that are currently stored at the target replica so that the source replica can avoid returning notifications for items that are not stored at the target replica.

18. A computer implemented method as recited in claim 17 where the list of identifiers for the items that are currently stored at the target replica is sent in compressed form, such as using a Bloom filter.

\* \* \* \* \*